(12) United States Patent
Reifenrath

(10) Patent No.: US 12,610,948 B2
(45) Date of Patent: Apr. 28, 2026

(54) CHOLINE CHLORIDE ADJUVANT FOR FATTY ACID BASED BIOPESTICIDE

(71) Applicant: Stratacor, Inc., Novato, CA (US)

(72) Inventor: William Reifenrath, Novato, CA (US)

(73) Assignee: Stratacor, Inc., Novato, CA (US)

( * ) Notice: Subject to any disclaimer, the term of this patent is extended or adjusted under 35 U.S.C. 154(b) by 74 days.

(21) Appl. No.: 17/492,317

(22) Filed: Oct. 1, 2021

(65) Prior Publication Data

US 2022/0167613 A1    Jun. 2, 2022

Related U.S. Application Data

(60) Provisional application No. 63/120,114, filed on Dec. 1, 2020.

(51) Int. Cl.

| | |
|---|---|
| *A01N 33/12* | (2006.01) |
| *A01N 37/02* | (2006.01) |
| *A01P 7/04* | (2006.01) |

(52) U.S. Cl.

CPC ............. *A01N 33/12* (2013.01); *A01N 37/02* (2013.01); *A01P 7/04* (2021.08)

(58) Field of Classification Search

CPC ...... A01P 7/00; A01P 7/04; A01P 5/00; A01P 7/02; A01P 9/00

See application file for complete search history.

(56) References Cited

U.S. PATENT DOCUMENTS

| | | | |
|---|---|---|---|
| 6,306,415 B1 | 10/2001 | Reifenrath | |
| 6,953,814 B2 | 10/2005 | Reifenrath | |
| 8,911,757 B2 | 12/2014 | Reifenrath | |
| 9,545,100 B2 | 1/2017 | Reifenrath | |
| 2005/0288204 A1* | 12/2005 | Matts ..................... | A61L 2/186 |
| | | | 510/375 |
| 2016/0120180 A1 | 5/2016 | Crosby et al. | |
| 2017/0035046 A1 | 2/2017 | Goyal et al. | |
| 2017/0251663 A1* | 9/2017 | Man ...................... | A01N 25/30 |
| 2018/0070584 A1* | 3/2018 | Meredith .............. | A01N 25/02 |
| 2019/0133116 A1 | 5/2019 | Liu et al. | |
| 2019/0133117 A1 | 5/2019 | Liu et al. | |

FOREIGN PATENT DOCUMENTS

| | | |
|---|---|---|
| EP | 3090632 A1 | 11/2016 |

OTHER PUBLICATIONS

"Definition of Knock-Down and Mortality for Adult Mosquitoes Adopted", 14th Whopes Working Group Meeting, 2012, p. 66.

"Tolerance Exemption Petition for the Active Ingredients C8-C10 N-Carboxylic Acids (Octanoic Acid, Nonanoic Acid, and Decanoic Acid)", US Environmental Protection Agency, Oct. 8, 2009.

Chellquist et al., "Distribution and Fate of Diethyl Malonate and Diisopropyl Fluorophosphate on Pig Skin in Vitro", Journal of Pharmaceutical Sciences, vol. 77, Issue 10, Oct. 1988, pp. 850-854.

Ciolino , "Personal Communication", Agro Green Business, Emery Oleochemicals, 2019.

Dunford et al., "Determination of Insecticidal Effect (LC50 and LC90) of Organic Fatty Acids Mixture (C8910+silicone) Against Aedes Aegypti and Aedes Albopictus (Diptera: Culicidae)", Journal of Medical Entomology, vol. 53, No. 3, 2016, pp. 699-702.

Dunford et al., "Determination of Insecticidal Effect (LCD50 and LCD90 of Organic Fatty Acids Mixture (C8910+Silicone) Against Malaria Vectors", Journal of Parasitology and Vector Biology, vol. 6, No. 9, Aug. 2014, pp. 131-141.

Keyl et al., "Physiologically Active Choline Esters in Certain Marine Gastropods and Other Invertebrates", The Journal of Physiology, vol. 139, 1957, pp. 434-454.

Mullens et al., "Effects of Fatty Acid and Geraniol Repellent-Oil Mixtures Applied to Cattle on Blood Feeding and Reproductive Parameters in Field Populations of Haematobia Irritans (Diptera: Muscidae)", Journal of Medical Entomology, vol. 55, Issue 2, Mar. 2018, pp. 408-416.

Mullens et al., "Field Trials of Fatty Acids and Geraniol Applied to Cattle for Suppression of Horn Flies, Haematobia Irritans (Diptera: Muscidae), with Observations on Fly Defensive Behaviors", Veterinary Parasitology, vol. 245, Oct. 15, 2017, pp. 14-28.

Mullens et al., "Laboratory Repellency Trials of Fatty Acids Against House Flies, Horn Flies, and Stable Flies (Diptera: Muscidae)", Pest Management Science, vol. 65, 2009, pp. 1360-1366.

Reifenrath , "Controlled Release Formulations of Fatty Acid Based Repellent/Insecticide for Livestock Protection", Stratacor, Incorporated, Proposal No. 2014-00521, Phase 1 Final Report, Feb. 26, 2015, 1 page.

Reifenrath , "Enhanced Skin Absorption and Fly Toxicity of Permethrin in Emulsion Formulation", Bull Environ Contam Toxicol, vol. 78, No. 5, Jul. 10, 2007, pp. 299-303.

Reifenrath , "Laboratory (In Vitro) Test Method for Determining the Disposition of Chemicals in Contact with the Skin", Pesticide Formulation and Delivery Systems, Translating Basic Science into Products, vol. 34, May 2015, pp. 52-64.

Reifenrath , "Laboratory and Field Studies of C8910, a Fatty-Acid-Based Insect/Arthropod Repellent and Biopesticide", Pesticide Formulation and Delivery Systems: 34th Volume, Translating Basic Science Into Products, May 2015, pp. 36-51.

Reifenrath , "Natural Fly Repellent for Livestock", CSREES Award No. 2003-33610-13044. Phase II Final Report, Feb. 1, 2007.

Roh et al., "Spatial Repellency, Antifeedant Activity and Toxicity of Three Medium Chain Fatty Acids and their Methyl Esters of Coconut Fatty Acid Against Stable Flies", Pest Management Science, vol. 76, Aug. 2019, pp. 405-414.

(Continued)

*Primary Examiner* — Audrea B Coniglio

(74) *Attorney, Agent, or Firm* — Kilpatrick Townsend & Stockton LLP

(57) ABSTRACT

This disclosure provides insect or arthropod pesticidal compositions of mono alpha carboxylic acids or esters thereof in combination with an emulsifier, an adjuvant comprising choline, and a carrier. Also provided are aqueous concentrates comprising the pesticidal compositions, as well as aqueous dilutions of the aqueous concentrates. Also provided are methods of killing or incapacitating insects or arthropods and methods of treating cattle to protect against biting insects or arthropods using such compositions.

30 Claims, 16 Drawing Sheets

(56) References Cited

OTHER PUBLICATIONS

Samuel et al., "Evaluation of the Toxicity and Repellence of an Organic Fatty Acids Mixture (C8910) Against Insecticide Susceptible and Resistant Strains of the Major Malaria Vector Anopheles Funestus Giles (Diptera:Culicidae)", Parasites & Vectors, vol. 8, 2015, 7 pages.

Siegler et al., "Some Insecticidal Properties of the Fatty Acid Series", Journal of Agricultural Research, vol. 29, 1925, pp. 259-261.

Taylor , "The Efficacy of 15% Stratacor Liquid and Wettable Powder as Tick Repellents", Test report RJT 171-2010 to Afrivet Business Management, Limited South Africa (Results Presented at the 2012 Repellent Symposium at the Entomological Society of America Annual Meeting), 2010, 2 pages.

Younger , "C8910 Fatty Acids in Clay. Honey Bee (*Apis mellifera*) Acute Contact Toxicity Limit Test", Stillmeadow, Incorporated, Sugar Land, TX. Laboratory Study No. 17957-14, 2014.

Zhu et al., "Comparisons of Antifeedancy and Spatial Repellency of Three Natural Product Repellents Against Horn Flies, *Haematobia irritans* (Diptera: Muscidae)", Pest Management Science, vol. 70, 2015, 8 pages.

"Notice of Pesticide Registration", US EPA Reg. No. 89402-1, AP-8030, Adjuvants Unlimited, LLC, 2016, 11 pages.

Bayoh et al., "Anopheles Gambiae: Historical Population Decline Associated with Regional Distribution of Insecticide-Treated Bed Nets in Western Nyanza Province, Kenya", Malaria Journal, vol. 9, 2010, 12 pages.

Zhu et al., "Better than DEET Repellent Compounds Derived from Coconut Oil", Scientific Reports, vol. 8, No. 1, Sep. 2018, 12 pages.

Donahue , "Evaluation of C8910/kaolin Clay Against Bed Bugs Cimex Lectularius in the Laboratory", Sierra Research Laboratories, Test Report, 2013, 15 pages.

Ramanujan , "Insect Pollinators Contribute $29 Billion to U.S. Farm Income", May 22, 2012, 3 pages.

Reifenrath et al., "Experimental Methods for Determining Permethrin Dermal Absorption", Journal of Toxicology and Environmental Health Part A, vol. 74, No. 5, Jan. 2011, pp. 325-335.

Ross et al., "Estimation of the Percutaneous Absorption of Permethrin in Humans Using the Parallelogram Method", Journal of Toxicology and Environmental Health Part A, vol. 74, No. 6, 2011, pp. 351-363.

Rowland et al., "Control of Malaria in Pakistan by Applying Deltamethrin Insecticide to Cattle: A Community-Randomised Trial", The Lancet, vol. 357, Issue 9271, Jun. 9, 2001, pp. 1837-1841.

Som et al., "Status of Surfactants as Penetration Enhancers in Transdermal Delivery", Journal of Pharmacy and Bioallied Sciences, vol. 4, No. 1, 2012, pp. 2-9.

Ball, et al., "Model Reactions Involving Ester Functional Groups during Thermo-Oxidative Degradation of Biodiesel" , Journal of the American Oil Chemists' Society, No. 96, 2019, pp. 1153-1161.

Siegler, et al., "Some Insecticidal Properties of the Fatty Acid Series", Journal of Agricultural Research, vol. 29, No. 5, Sep. 1, 1924, pp. 259-261.

Steimer, et al., "Mass spectrometry characterization of peroxycarboxylic acids as proxies for reactive oxygen species (ROS) and highly oxygenated molecules (HOMs) in atmospheric aerosols", Department of Chemistry, University of Cambridge, 2017, pp. 1-9.

"The NIFA Peer Review Process for Competitive Grant Applications", United States Department of Agriculture, Jan. 30, 2018, pp. 1-4.

Ahmed, K., and P. G. Scholefield. "Studies of fatty acid oxidation. 8. The effects of fatty acids on metabolism of rat-brain cortex in vitro." *Biochemical Journal* 81.1 (1961): 45-53.

Dunford, James C., et al. "Determination of insecticidal effect (LCD50 and LCD90) of organic fatty acids mixture (C8910+ silicone) against malaria vectors." *Journal of Parasitology and Vector Biology* 6.9 (2014): 131-141.

Rossi, C. R., et al. "Relationship between oxidative phosphorylation efficiency and phospholipid content in rat liver mitochondria." *Archives of Biochemistry and Biophysics* 107.1 (1964): 170-175.

Sanchez, J., & Myers, T.N., "Peroxides and Peroxide Compounds, Organic Peroxides", Kirk-Othmer Encyclopedia of Chemical Technology, vol. 18, 2000, 86 pages.

Uhl, et al. "Peroxy Compounds, Organic", Ullmann's Encyclopedia of Industrial Chemistry, 2018, 45 pages.

"Choline Chloride, Aqueous, Feed Grade", Balchem Corporation, Version No. 11.16, Safety Data Sheet according to OSHA HazCom Standard (2012) requirements, Issued Jul. 10, 2019, 10 pages.

"Choline Chloride", Sigma-Aldrich—W450001, Safety Data Sheet, Version 6.6, printed Jun. 3, 2025, 11 pages.

"Choline Chloride", CAS No. 67-48-1, ThermoFisher Scientific, Safety Data Sheet, Revised Dec. 24, 2021, 7 pages.

* cited by examiner

1

CHOLINE CHLORIDE ADJUVANT FOR FATTY ACID BASED BIOPESTICIDE

CROSS REFERENCE TO RELATED APPLICATIONS

This application claims priority to U.S. Provisional Application No. 63/120,114, filed Dec. 1, 2020, titled "CHOLINE CHLORIDE ADJUVANT FOR FATTY ACID BASED BIOPESTICIDE," the disclosure of which is incorporated herein by reference in its entirety.

STATEMENT AS TO RIGHTS TO INVENTIONS MADE UNDER FEDERALLY SPONSORED RESEARCH AND DEVELOPMENT

This invention was made with Government support under U.S. Department of Agriculture National Institutes of Food and Agriculture (USDA-NIFA) SBIR Phase I Grant No. 2020-33610-31989. The Government has certain rights in this invention.

BACKGROUND

The emergence of agricultural pest resistance to pesticides and a decreasing number of registered pesticides has put the control of agricultural pests, or vectors, in peril world-wide. Additionally, there are safety and environmental concerns from unintended exposures of humans and beneficial insects to pesticides. On the other hand, mixtures of medium chain fatty acids provide a safer alternative for vector control. The components of the mixtures have been approved by the US FDA as direct food additives (e.g., as flavoring agents) in the US since 1965 and are categorized as GRAS (generally recognized as safe).

While the fatty acid compositions described above have proven effective, several factors inherent to fatty acids may limit their practical use for certain applications as a biopesticide. The medium chain fatty acids (8-10 carbons) and shorter chain fatty acids are volatile, thus limiting their persistence on treated surfaces. While longer chain fatty acids are less volatile, their pesticidal activity diminishes with increased chain length. When applied to mammals, fatty acids can penetrate into the skin from the skin surface, where they must remain to be effective against pests. The odor associated with the volatile fatty acids, including the medium chain fatty acids, can be offensive to some. For mammals, fatty acids can irritate the eyes, skin, and respiratory passages, with the degree of irritation being a function of dose. For plants, phytotoxicity (leaf wilt) can be an issue for soft leafed plants (e.g. nasturtiums), again with severity being a function of dose. For insects, the biopesticidal activity appears to be reversible with time, with revival being more pronounced at lower surface doses. While controlled release formulation can be helpful in reducing the negative impact of these factors, such formulations tend to be complex, resulting in production difficulties, stability issues and increased cost. Described herein are compositions that are effective at lower doses, thereby mitigating many of the problems described above.

BRIEF SUMMARY OF THE INVENTION

In one embodiment, provided herein is an insect or arthropod pesticidal composition comprising an active ingredient comprising a mono alpha carboxylic acid or ester thereof having a straight carbon chain from 6 to 18 carbon atoms long; an emulsifier; an adjuvant comprising choline; and a carrier. In some embodiments, the emulsifier comprises a carboxylic acid salt. In some embodiments, the adjuvant comprises a choline salt (e.g., choline chloride). In some embodiments, the carrier comprises an aqueous emulsion. In some embodiments, the carrier comprises water.

In one embodiment, provided herein is an insect or arthropod pesticidal composition wherein the active ingredient comprises a mixture of fatty acids, each fatty acid having a straight carbon chain from 6 to 18 carbon atoms long. In some embodiments, the mixture of fatty acids comprises two or three of a first fatty acid molecule having a straight carbon chain from 6 to 8 carbon atoms long; a second fatty acid molecule having a straight carbon chain from 8 to 9 carbon atoms long; and a third fatty acid molecule having a straight carbon chain from 9 to 10 carbon atoms long, wherein the first fatty acid molecule, the second fatty acid molecule, and the third fatty acid molecule are all different. In one embodiment, the first fatty acid molecule comprises octanoic acid, the second fatty acid molecule comprises nonanoic acid, and the third fatty acid molecule comprises decanoic acid.

In one embodiment, provided herein is an insect or arthropod pesticidal composition wherein the active ingredient comprises a fatty acid ester or a mixture of fatty acid esters, each fatty acid ester having a straight carbon chain from 6 to 18 carbon atoms long.

In some embodiments, provided herein is an insect or arthropod pesticidal composition wherein the active ingredient comprises a mixture of two or three fatty acids selected from the group consisting of octanoic acid, nonanoic acid, and decanoic acid; the emulsifier comprises sodium salts of the two or three fatty acids; and the adjuvant comprises choline chloride. In one embodiment, the two or three fatty acids are octanoic acid, nonanoic acid, and decanoic acid, wherein the octanoic acid, nonanoic acid, and decanoic acid are present in about a 1:1:1 ratio by weight. In one embodiment, the two or three fatty acids are octanoic acid and decanoic acid, wherein the octanoic acid and decanoic acid are present in about a 60:40 ratio by weight.

Also provided herein are aqueous concentrates comprising the insect or arthropod pesticidal compositions. Also provided are aqueous dilutions of the aqueous concentrates.

In some embodiments, an aqueous dilution of the present disclosure comprises the active ingredient at about 0.005% to about 5% by weight of the dilution, the emulsifier at about 0.005% to about 5% by weight of the dilution, and the adjuvant at about 0.005% to about 5% by weight of the dilution. In one embodiment, the aqueous dilution comprises the active ingredient at about 1% by weight of the dilution, the emulsifier at about 4% by weight of the dilution, and the adjuvant at about 1% by weight of the dilution.

In another aspect, provided herein are methods for incapacitating or killing an insect or arthropod, the method comprising contacting the insect or arthropod with one of the insect or arthropod pesticidal compositions described herein. In some embodiments, the insect or arthropod is selected from the group consisting of mosquitoes, cockroaches, house flies, stable flies, horn flies, horse flies, face flies, eye flies, biting midges, and ticks. In some embodiments, the insect or arthropod is resistant to permethrin.

In another aspect, provided herein are methods for treating cattle to protect against biting insects or arthropods, the method comprising applying one of the insect or arthropod pesticidal compositions described herein to the cattle. In some embodiments, applying the composition to the cattle comprises use of an automatic cattle sprayer.

DETAILED DESCRIPTION OF THE INVENTION

I. Introduction

Figure 1:
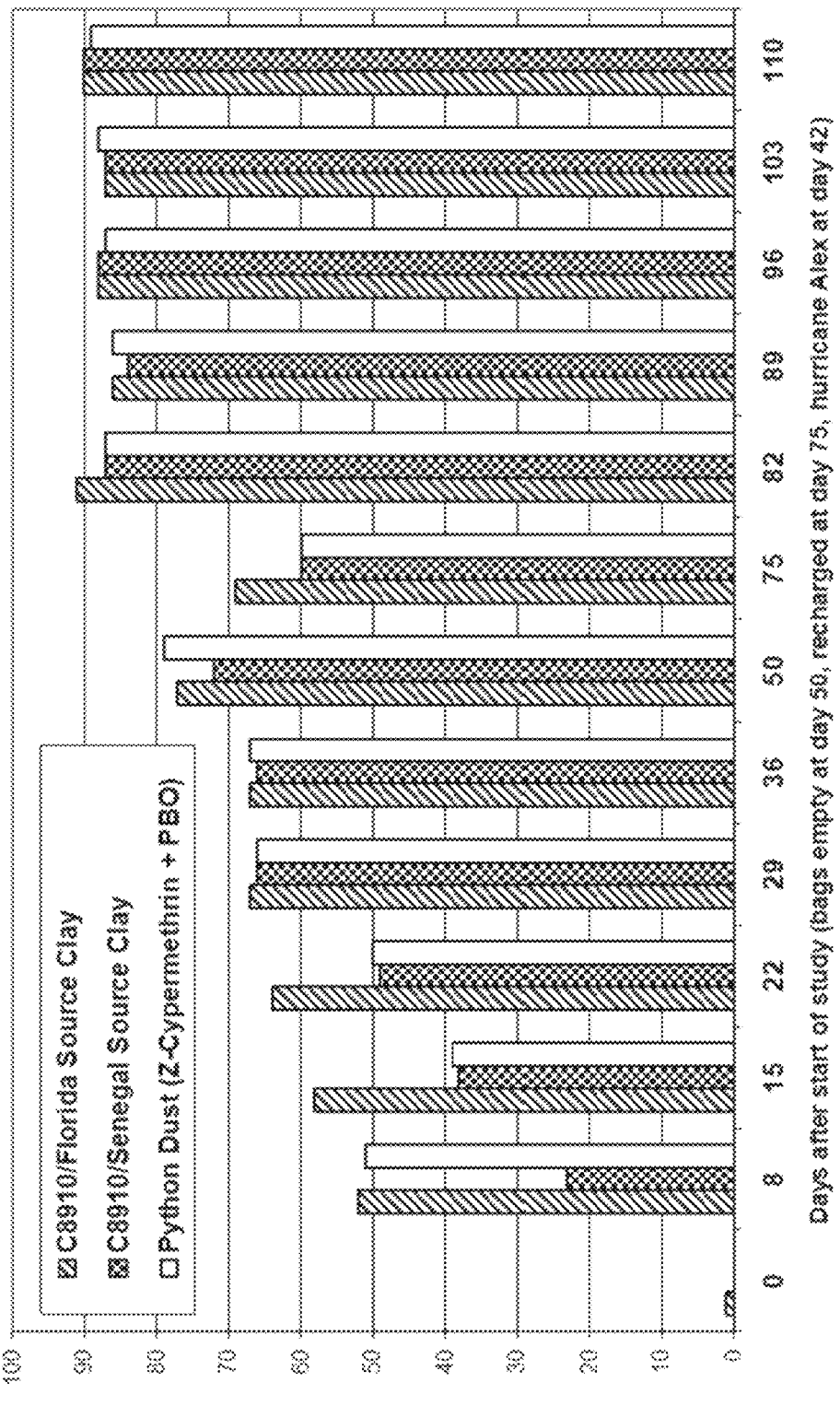
FIG. 1 shows the feasibility of protecting cattle against biting flies and ticks via a self-treatment cattle approach using a dust formulation of C8910. C8910 in two different clay dust formulations (30 head per 12.5 lb of each dust) was compared to a traditional insecticide for efficacy against horn fly (*Haematobia irritans* (L)). The study was performed from May 21 to Sep. 4, 2010. Bags were empty at day 50 and recharged at day 75. Hurricane Alex happened at day 42.

Provided herein are insect or arthropod pesticidal compositions of mono alpha carboxylic acids or esters thereof in combination with an emulsifier, an adjuvant comprising choline, and a carrier. Also provided are aqueous concentrates comprising the pesticidal compositions, as well as aqueous dilutions of the aqueous concentrates. Also provided are methods of killing or incapacitating insects or arthropods and methods of treating cattle to protect against biting insects or arthropods using such compositions. In some embodiments, the carboxylic acids of the compositions comprise combinations of free fatty acids selected from octanoic acid, nonanoic acid, or decanoic acid. These fatty acids are intermediaries in the energy metabolism occurring in living cells. Furthermore, all of the fatty acids have been used as food additives for over half a century in the US and Europe, are categorized as GRAS (generally recognized as safe) by the FDA, and have very low environmental toxicity.

However, several factors (e.g., volatility, skin penetration, odor, irritation of the skin, eyes, and respiratory passages, leaf wilt, incapacitation reversibility, etc.) inherent to fatty acids may limit their practical use for certain applications as a biopesticide, especially when used at a high dosage. The fatty acid compositions of the present disclosure provide the unexpected advantage of increased biopesticidal potency. In some embodiments, the inclusion of adjuvants comprising choline (e.g., choline chloride) increases the biopesticidal potency of the compositions. Choline chloride has no known pesticidal activity by itself, and tests with distilled water and 1% choline chloride in distilled water show little or no insecticidal effect. In some embodiments, as described further below, fatty acid formulations comprising choline chloride unexpectedly demonstrate more rapid insect incapacitation and significantly higher mortality (incapacitation at 24 hours post treatment) as compared to fatty acid formulations lacking choline chloride.

Previous tests have shown that fatty acid-based insecticidal compositions, such as C8910 (Reifenrath 2001, 2005; Mullens 2009) can be effective in insect control. Cattle field tests involving self-treatment dust bags have shown that C8910 formulated in attapulgite clay dust and applied twice daily can lead to fly reductions comparable to pyrethroid and organophosphorus agents (Reifenrath, 2015a), a level of efficacy that is unique among repellents. Rice field tests in California have shown that C8910, formulated in kaolin clay and dispersed as a wettable powder, significantly reduced overnight mosquito counts in light traps (Reifenrath, 2015a). Single applications of 15% C8910 oil formulations or clay dust formulations provided significant fly repellency in the laboratory (Mullens, 2009) and in cattle field studies (Mullens et al. 2017 and 2018, Zhu, 2014). A silicone oil formulation of C8910 (Ecovet) is now commercially available in the US (Dover Saddlery, SmartPak Equine and others, eco-vet.com). Appropriate choice of fragrance has reduced issues of fatty acid odor.

At surface doses below the level needed for repellency, C8910 functions as a contact insecticide against flies (Reifenrath, 2015a) and mosquitoes (Dunford et al., 2014, 2016). The insecticidal activity of C8910 provides an additional mechanism for fly control and is enhanced by formulations containing surfactants (Reifenrath, 2014). Mechanisms for the dual effects of repellency and fly toxicity are not well understood and clarification is beyond the scope of this application. Formulations of permethrin containing surfactant can also enhance fly toxicity, but such formulations exhibit the detrimental effect of markedly enhanced mammalian skin absorption (Reifenrath, 2007a). Interestingly, C8910 was shown to be equally effective against both insecticide sensitive and resistant mosquitoes (Samuel et al., 2015), and it may prove beneficial in combating resistance in livestock pests (e.g. stable and horn flies). C8910 is not a broad spectrum insecticide, and when 15% C8910 in clay formulation was applied directly to honey bees (*Apis mellifera*) at a dose of 100 µg actives, there was no significant difference in mortality between test and control groups (Younger, 2014).

The C8910 fatty acids are volatile (Reifenrath, 2015b), and 24-61% of the applied dose evaporated exponentially from clay formulation applied to skin. Skin penetration will also limit duration for dermal treatments (e.g., about 50-75% of the applied dose of octanoic and decanoic acid penetrated cattle skin from mineral oil). To provide finer control of these modes of loss, the development of longer lasting controlled-release formulations (clay nanotubes, disintegrating granules, and microcapsules) for use as premises spray and direct skin application for protecting cattle against biting flies and ticks was investigated (Reifenrath, 2015c), with none of the carriers showing an extended duration. Since that time, however, it has been shown that an aqueous dilution (to 1% C8910) of an emulsifiable concentrate could achieve a similar duration of effectiveness (2-3 days after a single treatment) as the 15% oil formulation. Laboratory results confirm that an even lower concentration (0.3%) will kill the most common livestock flies and mosquitoes (Table 1). The limited duration of such a formulation can be overcome by more frequent application (e.g. walk-through sprayers). The feasibility (comparable control to a traditional insecticide) of such a self-treatment approach with a dust formulation of C8910 has been shown (FIG. 1). As shown in FIG. 1, once control had been established, a residual effect lasted for 25 days when treatment was discontinued at day 50.

TABLE 1

| Incapacitating and toxic effects of 0.3% C8910 water dispersions sprayed against house flies and blood feeding stable flies and mosquitoes in the laboratory. | | | |
| --- | --- | --- | --- |
| Insect | Test Material | Observation at 0.5 m. | Observation at 24 h |
| House Fly[a] | C8910 | 100% incapacitation | 100% incapacitated or dead |
| Stable Fly[b] | C8910 | 100% incapacitation | 100% dead |
| Horn Fly[c] | C8910 | 100% incapacitation | 100% dead |
| Mosquito[d] | C8910 | 100% incapacitation | 100% incapacitated or dead |
| Mosquito[e] | C8910 | 100% incapacitation | 100% incapacitated or dead |

[a]*Musca domestica*
[b]*Stomoxys calcitrans*
[c]*Haematobia irrnans*
[d]*Aedes aegypti*
[e]*Anopheles quadramaculatus*
[e]Two grams of 15% C8910 (5% each acid, octanoic, nonanoic, decanoic) on carrier dispersion in 100 ml of water. No effect of carrier alone at either time point.

All of the fatty acids are regulated as GRAS by the US FDA, and the US EPA has deemed them safe for use on food producing animals (Anonymous, 2009). Environmentally, the fatty acids are relatively benign, with low toxicity to bees (Younger, 2014) and other beneficial insects, fish and birds. US field studies have shown that C8910 dust will provide effective (90% control) of horn flies on cattle (1000-1500 flies/head on controls) by the use of a topical dust treatment (dust bag self-applicators) comparable to pyrethroids (FIG. 1) and organophosphorus type pesticides (Reifenrath, 2007b), There can be a substantial residual effect of C8910 in these dust bag trials (60-70% control at day 75, despite lack of treatment between days 50 and 75, FIG. 1). Since single treatments of C8910 provided only 2-3 days of horn fly relief (Mullens, 2017 and 2018), it is reasonable to suspect that the continued application from the dust bags resulted in a reduction in the subpopulation of flies feeding on these cattle. This level of efficacy and residual effect is likely achieved by insecticidal action rather than simple repellency, as laboratory exposures of 0.3% C8910 wettable powder to horn flies resulted in immediate incapacitation and 100% mortality at 24 hours (Table 1).

The advantage of C8910 over permethrin or other pyrethroids or organophosphorus (OP) compounds is firstly that of safety. Secondly, the chemical structures of the fatty acids are quite distinct from pyrethroids, making cross resistance unlikely. Indeed, C8910 was quite effective in killing tick larvae (Taylor, 2010) and mosquitoes (Samuel, 2015) that were resistant to conventional pesticides. Thirdly, the subject fatty acids are commodity chemicals derived from coconuts (Malaysia) and cattle tallow, making them relatively inexpensive as compared to existing pesticides.

Figure 2:
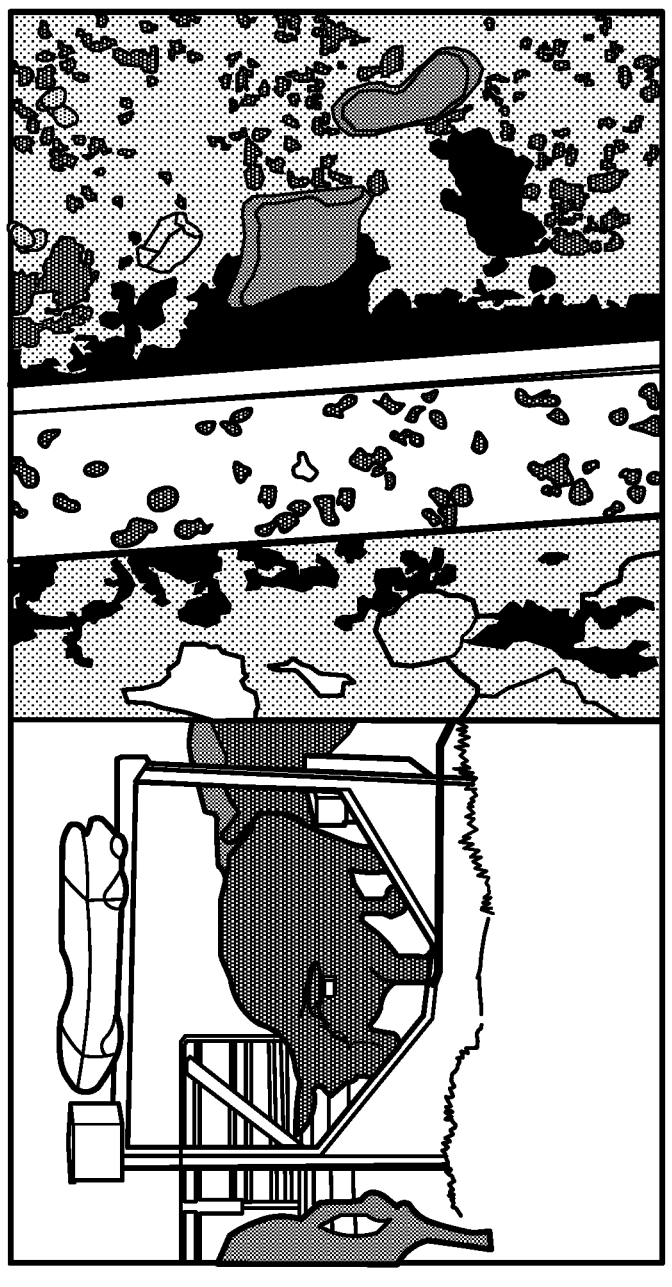
FIG. 2 shows an automated cattle sprayer (3D Cattle Equipment Co., left) and dead horn flies littering the area beneath the automated sprayer (right).

Laboratory spray tests of a 1% emulsion of C8910 showed that it was effective in killing house flies, and preliminary tests with an automated sprayer showed that it will kill horn flies (FIGS. 2A and 2B). Also, mist blower applications of C8910 in emulsion or wettable powder formulation (C8910/kaolin) were effective in killing adult stable flies confined to small screened containers in the field of spray, with the emulsion formulation being more effective and easier to apply. Further, repeated weekly applications of C8910/kaolin, C8910/microcapsule, and permethrin/kaolin to stable fly resting sites give a progressively more effective and longer lasting reduction of stable flies on cattle, even though the cattle were not being directly sprayed. Implicit in this strategy to provide long lasting protection is the reliance on the pesticidal effect of C8910, giving the cattle protection during the time that reduced fly populations try to recover.

For most insects that are sensitive to C8910, the pesticidal activity takes place at doses that are significantly lower than repellent doses, so less active is required as compared to a strategy that relies on vapor repellency or controlled vapor release. Use of the C8910 emulsion in automated spray devices can allow continuous control.

The studies in Examples 1 and 2, below, further demonstrate the effectiveness of fatty acid-based insecticidal compositions.

II. Definitions

"Arthropod" refers to members of the arthropod phylum, including, but not limited to, ticks, spiders, scorpions, cockroaches, centipedes, millipedes and insects. Insects include, but are not limited to, mosquitoes, house flies, stable flies, horn flies, horse flies, face flies, eye flies, and biting midges.

"Pesticide" refers to a compound or substance that repels, incapacitates, or kills a pest, such as an insect or arthropod. A pesticide of the present disclosure will comprise at least one active ingredient, and may further comprise an emulsifier, an adjuvant, a carrier, or combination thereof.

As used herein, the term "active ingredient" refers to the component of a pesticide that is biologically and/or chemically active against a target pest. Examples of active ingredients useful in the insecticidal compositions of the present disclosure include, but are not limited to, a free fatty acid (i.e., where the adjective "free" refers to the unionized carboxylic acid moiety), a mixture of free fatty acids, an ester of a fatty acid, or a mixture of esters of fatty acids. The fatty acid esters may serve as precursors to free fatty acids.

As used herein, the term "emulsifier" refers to an additive that helps two liquids mix. The emulsifiers herein may also act as carriers and promote adherence or absorption or transport of insecticidal compositions across the surface of insects or arthropods. The emulsifiers can be any suitable material. Examples of emulsifiers useful in the insecticidal compositions of the present disclosure include, but are not limited to, sodium salts of fatty acids.

As used herein, the term "adjuvant" refers to an additive that enhances the effectiveness of an insecticidal composition. The adjuvants can be any suitable material. Examples of adjuvants useful in the insecticidal compositions of the present disclosure include, but are not limited to, compounds comprising choline (e.g., choline salts, choline chloride, etc.).

"Carrier" refers to the vehicle for the active ingredient that promotes adherence or absorption or transport across the surface of insects or arthropods. The carrier can be any suitable material, such as a powder, a solvent, or an emulsion. Examples of carriers useful in the present invention include, but are not limited to, a wettable powder, an emulsifiable concentrate (e.g., an aqueous emulsion), an inorganic solvent (e.g., water), and an organic solvent.

Emulsifiable concentrates are solutions capable of forming an emulsion, such as Evercide without the permethrin (produced by MGK Corporation, Minneapolis, Minnesota) or an aqueous emulsion. The emulsifiable concentrate enhances absorption of the solution by the insect. Wettable powders are those that are capable of absorbing water, such as Kaolin-P, a hydrated aluminum silicate.

As used herein, the term "organic solvent" refers to water-miscible or -immiscible solvents capable of dissolving either or both of water-soluble and water-insoluble organic compounds. Exemplary organic solvents useful in the present invention include, but are not limited to, hexanes, pentanes, benzene, toluene, pyridine, ethyl acetate, diethyl ether, methanol, ethanol, isopropanol, acetone, methylene chloride and chloroform. One of skill in the art will appreciate that other organic solvents are useful in the present invention.

As used herein, the term "aqueous concentrate" refers to a formulation of insecticidal compositions in water that is intended to be diluted prior to use. The various components of the insecticidal composition (e.g., active agent, emulsifier, adjuvant, carrier, or combination thereof) may be present at any desired concentration such that dilution with a specified amount of water will lead to a working solution at a desired concentration. The insecticidal compositions may be supplied as aqueous concentrates to facilitate distribution, for example, by way of their smaller volume.

As used herein, the term "aqueous dilution" refers to a formulation of insecticidal compositions in water that is obtained by diluting an aqueous concentrate with water. The term may refer to a formulation that is ready to be used in a final application, or to an intermediate dilution of an aqueous concentrate that may be diluted further prior to use.

"Incapacitate" refers to rendering an insect or arthropod unable to move, fly or escape.

As used herein, the term "fatty acid" refers to a carboxylic acid having an aliphatic tail, typically from 4 to 30 carbon atoms long. Fatty acids can be saturated, mono-unsaturated or poly-unsaturated. Fatty acids useful in the present invention also include branched fatty acids such as iso-fatty acids. Examples of fatty acids useful in the present invention, include, but are not limited to, butyric acid (C4), caproic acid (C6), caprylic acid (C8), capric acid (C10), lauric acid (C12), myristic acid (C14), palmitic acid (C16), palmitoleic acid (C16), stearic acid (C18), isostearic acid (C18), oleic acid (C18), vaccenic acid (C18), linoleic acid (C18), alpha-linoleic acid (C18), gamma-linolenic acid (C18), arachidic acid (C20), gadoleic acid (C20), arachidonic acid (C20), eicosapentaenoic acid (C20), behenic acid (C22), erucic acid (C22), docosahexaenoic acid (C22), lignoceric acid (C24) and hexacosanoic acid (C26). One of skill in the art will appreciate that other fatty acids are useful in the present invention.

As used herein, the term "contacting" refers to the process of bringing a substance (e.g., a pesticidal composition as disclosed herein) into contact with an insect or arthropod such that the substance can have an effect on the insect or arthropod. Contacting an insect or arthropod with a substance can be achieved in a variety of ways (e.g., through application of the substance to cattle or through direct application of the substance to an insect or arthropod).

III. Pesticidal Compositions

The present disclosure provides pesticidal compositions for incapacitating or killing insects, arthropods, or insects and arthropods. In some embodiments, the pesticidal composition comprises an active ingredient comprising a mono alpha carboxylic acid or an ester thereof. In some embodiments, the pesticidal composition comprises an emulsifier (e.g., fatty acid salts). In some embodiments, the pesticidal composition comprises an adjuvant comprising choline (e.g., choline chloride). In some embodiments, the pesticidal composition comprises a carrier (e.g., water).

The mono alpha carboxylic acids useful in the active ingredient of the pesticidal compositions of the present disclosure can have straight carbon chains from 6 to 18 carbon atoms long (e.g., 6, 7, 8, 9, 10, 11, 12, 13, 14, 15, 16, 17 or 18 carbon atoms long). In some embodiments, the carboxylic acids are fatty acids. Examples of fatty acids useful in the active ingredient include, but are not limited to, hexanoic acid (C6), heptanoic acid (C7), octanoic acid (C8), nonanoic acid (C9), decanoic acid (C10), undecanoic acid (C11) and dodecanoic acid (C12), and mixtures and combinations thereof.

In some embodiments, the active ingredient comprises a mixture of fatty acids. For example, the active ingredient may comprise a mixture of fatty acids, each fatty acid having a straight carbon chain from 6 to 18 carbon atoms long (e.g., 6, 7, 8, 9, 10, 11, 12, 13, 14, 15, 16, 17 or 18 carbon atoms long). In some embodiments, the mixture of fatty acids comprises at least two, e.g., two or three, of: a first fatty acid molecule having a straight carbon chain from 6 to 8 carbon atoms long, a second fatty acid molecule having a straight carbon chain from 8 to 9 carbon atoms long, and a third fatty acid molecule having a straight carbon chain from 9 to 10 carbon atoms long. In some embodiments, the first fatty acid molecule, the second fatty acid molecule, and the third fatty acid molecule are all different from each other. In some embodiments, the active ingredient comprises at least two of octanoic acid (C8), nonanoic acid (C9), and decanoic acid (C10). In some embodiments, the active ingredient comprises two or three of octanoic acid (C8), nonanoic acid (C9), and decanoic acid (C10). In some embodiments, the active ingredient comprises a mixture of octanoic acid, nonanoic acid, and decanoic acid.

In some embodiments, the active ingredient comprises a mixture of fatty acids, where the mixture of fatty acids comprises a first fatty acid molecule having a straight carbon chain from 6 to 8 carbon atoms long, and a second fatty acid molecule having a straight carbon chain from 9 to 10 carbon atoms long. In some embodiments, the active ingredient comprises a mixture of fatty acids, where the mixture of fatty acids comprises a first fatty acid molecule having a straight carbon chain 8 carbon atoms long, and a second fatty acid molecule having a straight carbon chain from 9 carbon atoms long. In some embodiments, the active ingredient comprises a mixture of fatty acids, where the mixture of fatty acids comprises a first fatty acid molecule having a straight carbon chain 8 carbon atoms long, and a second fatty acid molecule having a straight carbon chain 10 carbon atoms long. In some embodiments, the active ingredient comprises a mixture of fatty acids, where the mixture of fatty acids comprises a first fatty acid molecule having a straight carbon chain 9 carbon atoms long, and a second fatty acid molecule having a straight carbon chain 10 carbon atoms long. In some embodiments, the active ingredient comprises a mixture of octanoic acid and nonanoic acid. In some embodiments, the active ingredient comprises a mixture of nonanoic acid and decanoic acid. In some embodiments, the active ingredient comprises a mixture of octanoic acid and decanoic acid.

The fatty acids of the active ingredient can be present in any suitable amount. For example, the fatty acids can be present from 1 to 99% by weight of the composition, from about 5 to about 95% by weight, from 1 to 50% by weight, from 5 to 25% by weight, or at about 15% by weight. In some embodiments, the active ingredient comprises a first fatty acid molecule, a second fatty acid molecule, and a third fatty acid molecule, wherein each fatty acid molecule can individually comprise from about 5% to about 95% of the active ingredient by weight. The fatty acids of the composition can be present in any suitable ratio. In some embodiments, the active ingredient comprises a first fatty acid molecule and a second fatty acid molecule, and the first fatty acid molecule and the second fatty acid molecule of the active ingredient are present in about a 1:1 ratio by weight.

In some embodiments, the active ingredient comprises a first fatty acid molecule, a second fatty acid molecule, and a third fatty acid molecule, and the first, second, and third fatty acid molecules of the active ingredient are present in about a 1:1:1 ratio by weight.

In some embodiments, the active ingredient comprises an ester. In some embodiments, the ester is a fatty acid ester. In some embodiments, the active ingredient comprises a mixture of fatty acid esters, each fatty acid ester having a straight carbon chain from 6 to 18 carbon atoms long.

In some embodiments, the pesticidal compositions of the present disclosure further comprise an emulsifier. The emulsifier may be present in any suitable amount. For example, the emulsifier may be present from 1 to 99% by weight of the composition, from about 5 to about 95% by weight, from 1 to about 50% by weight, from 5 to 25% by weight, or at about 15% by weight. In some embodiments, the emulsifier may promote adherence or absorption or transport of insecticidal compositions across the surface of insects or arthropods. The emulsifiers can be any suitable material. In some embodiments, the emulsifiers comprise carboxylic acid salts (e.g., sodium salts of fatty acids). In some embodiments, the emulsifiers comprise a surfactant. A wide variety of surfactants may be useful in the pesticidal compositions of the present disclosure, including, but not limited to, anionic surfactants (e.g., sodium lauryl sulfate), nonionic surfactants (e.g., long chain alcohols, Tweens), cationic surfactants (e.g., quaternary ammonium salts), and zwitterionic or amphoteric surfactants (e.g., cation and anion).

In some embodiments, the emulsifier comprises a single species of carboxylic acid salt (e.g., sodium salt of octanoic acid). In some embodiments, the emulsifier is a mixture of carboxylic acid salts. In some embodiments, the mixture of carboxylic acid salts comprises sodium salts of the fatty acids of the active ingredient. For example, the pesticidal composition may comprise an active ingredient comprising a mixture of octanoic acid and decanoic acid and an emulsifier comprising a mixture of sodium salts of octanoic acid and decanoic acid. In another example, the pesticidal composition may comprise an active ingredient comprising a mixture of octanoic acid, nonanoic acid, and decanoic acid and an emulsifier comprising a mixture of sodium salts of octanoic acid, nonanoic acid, and decanoic acid. The fatty acid salts of the emulsifier can individually comprise from about 5% to about 95% of the active ingredient by weight. The fatty acid salts of the composition can be present in any suitable ratio. In some embodiments, the first fatty acid salt and the second fatty acid salt of the emulsifier are present in about a 1:1 ratio by weight. In some embodiments, the first fatty acid salt and the second fatty acid salt of the emulsifier are present in about a 60:40 ratio by weight. In some embodiments, the first, second, and third fatty acid salts of the emulsifier are present in about a 1:1:1 ratio by weight.

In some embodiments, the pesticidal compositions of the present disclosure further comprise an adjuvant. The adjuvant may be present in any suitable amount. For example, the adjuvant may be present from 1 to 99% by weight of the composition, from about 5 to about 95% by weight, from 1 to about 50% by weight, from 5 to 25% by weight, or at about 15% by weight. In some embodiments, the adjuvant increases the potency of the pesticidal composition (e.g., increases the ability of the composition to incapacitate or kill insects, arthropods, or insects and arthropods). In some embodiments, the adjuvant comprises choline. In some embodiments, the adjuvant comprises a choline salt. In some embodiments, the adjuvant comprises choline chloride.

In some embodiments, the pesticidal compositions of the present disclosure further comprise a carrier. The carrier may be present in any suitable amount. For example, the carrier may be present from 1 to 99% by weight of the composition, from about 5 to about 95% by weight, from 1 to about 50% by weight, from 5 to 25% by weight, or at about 15% by weight. In some embodiments, the carrier promotes absorption of the active ingredient by the insect or arthropod. Carriers suitable for use in the pesticidal compositions include, but are not limited to, a wettable powder, an emulsifiable concentrate (e.g., an aqueous emulsion), a solvent, and an organic solvent.

Emulsifiable concentrates useful in the pesticidal compositions may include any composition forming an emulsion. Examples of emulsifiable concentrates include, but are not limited to, Evercide without the permethrin. In some embodiments, the carrier may comprise an aqueous emulsion.

Wettable powders useful in the pesticidal compositions may include any suitable powder that can be wet. Suitable powders can be inorganic materials such as clays, aluminates, silicates, or mixtures thereof, as well as polymeric materials. In some embodiments, the wettable powder is a mixture of an aluminate and a silicate. In some other embodiments, the wettable powder is Kaolin-P.

Solvents useful in the pesticidal compositions may include, but are not limited to, water. In some embodiments, the carrier for the pesticidal composition comprises water.

Organic solvents useful in the pesticidal compositions may include, but are not limited to, hexanes, pentanes, benzene, toluene, pyridine, ethyl acetate, diethyl ether, methanol, ethanol, isopropanol, acetone, methylene chloride and chloroform. Other organic solvents may also be useful.

In one embodiment, the pesticidal composition comprises an active ingredient comprising a mixture of octanoic acid, nonanoic acid, and decanoic acid at a 1:1:1 ratio by weight, an emulsifier comprising sodium salts of octanoic acid, nonanoic acid, and decanoic acid, and an adjuvant comprising choline chloride. In another embodiment, the pesticidal composition further comprises a carrier comprising an aqueous emulsion.

In another embodiment, the pesticidal composition comprises an active ingredient comprising a mixture of octanoic acid and decanoic acid at a 60:40 ratio by weight, an emulsifier comprising sodium salts of octanoic acid and decanoic acid, and an adjuvant comprising choline chloride. In another embodiment, the pesticidal composition further comprises a carrier comprising an aqueous emulsion.

IV. Aqueous Concentrates and Dilutions of the Pesticidal Compositions

In another aspect, provided herein are aqueous concentrates comprising the pesticidal compositions described above. The aqueous concentrates may be prepared using standard methods. In some embodiments, the aqueous concentrates may be diluted (e.g., with water) to form an aqueous dilution for use as a pesticide. For example, an aqueous concentrate may be shipped to a user and diluted with water to a working concentration prior to use. In some embodiments, more than one aqueous concentrate may be combined prior to, or concurrently with, dilution to form an aqueous dilution. The aqueous concentrates may comprise the pesticidal composition components at any concentration. In some embodiments, the aqueous concentrates are formulated to allow dilution to a desired concentration of the pesticidal composition.

In some embodiments, the active ingredient (e.g., free fatty acids or unionized fatty acid mixture) comprises from about 0.5% to about 99.5% (e.g., 1% to 99%, 5% to 95%, 10% to 90%, 20% to 80%, 30% to 70%, 40% to 60%, 1% to 25%, 1% to 50%, 50% to 99%, or 50% to 75%) by weight of the aqueous concentrate. In one embodiment, the active ingredient comprises from about 1% to about 99% by weight of the aqueous concentrate.

In some embodiments, the emulsifier (e.g., fatty acid sodium salt mixture) comprises from about 0.5% to about 99.5% (e.g., 1% to 99%, 5% to 95%, 10% to 90%, 20% to 80%, 30% to 70%, 40% to 60%, 1% to 25%, 1% to 50%, 50% to 99%, or 50% to 75%) by weight of the aqueous concentrate. In one embodiment, the emulsifier comprises from about 1% to about 99% by weight of the aqueous concentrate. In another embodiment, the emulsifier is present in the aqueous concentrate at a concentration 4 times higher than that of the active ingredient. For example, the active ingredient (e.g., free fatty acid mixture) may be present at 10% by weight of the aqueous concentrate, and the emulsifier (e.g., fatty acid sodium salt mixture) may be present at 40% by weight of the aqueous concentrate.

In some embodiments, the adjuvant (e.g., choline chloride) comprises from about 0.5% to about 99.5% (e.g., 1% to 99%, 5% to 95%, 10% to 90%, 20% to 80%, 30% to 70%, 40% to 60%, 1% to 25%, 1% to 50%, 50% to 99%, or 50% to 75%) by weight of the aqueous concentrate. In one embodiment, the adjuvant comprises from about 1% to about 99% by weight of the aqueous concentrate.

In some embodiments, the carrier (e.g., an aqueous emulsion or water) comprises from about 0.5% to about 99.5% (e.g., 1% to 99%, 5% to 95%, 10% to 90%, 20% to 80%, 30% to 70%, 40% to 60%, 1% to 25%, 1% to 50%, 50% to 99%, or 50% to 75%) by weight of the aqueous concentrate. In one embodiment, the carrier comprises from about 1% to about 99% by weight of the aqueous concentrate. In some embodiments, the carrier makes up the remaining balance of the aqueous concentrate after the other pesticidal composition components (e.g., the active ingredients, the emulsifier, and the adjuvant) are added.

In one embodiment, an aqueous concentrate may be prepared by mixing 308 g of octanoic acid/decanoic acid mix (C8/C10=60/40), 26.65 g of sodium hydroxide (98%), and 26.65 g of distilled water. The mixture forms a stable (homogeneous) liquid. The sodium hydroxide neutralizes or forms a sodium salt with a portion of the C8/C10 fatty acids to yield a free fatty acid concentration of 57%, and a fatty acid salt concentration of 33%.

In one embodiment, an aqueous concentrate may be prepared by mixing 241.6 g of octanoic acid/decanoic acid mix (C8/C10=60/40), 27.2 g of sodium hydroxide (98%), and 31.2 g of distilled water. The mixture forms a stable (homogeneous) liquid. The sodium hydroxide neutralizes or forms a sodium salt with a portion of the C8/C10 fatty acids to yield a free fatty acid concentration of 45%, and a fatty acid salt concentration of 41%.

In one embodiment, an aqueous concentrate may be prepared by adding 23.4 g of sodium hydroxide to a small volume of water to help dissolution, followed by addition of water up to 227.0 g total water. To this mixture, 90.2 g of C8C10 mix may be added with stirring to obtain an emulsion, followed by addition of 40.0 g of choline chloride. The result of this mixture is a clear solution with a head of foam, which dissipates over time. In this embodiment, the formulation is about 30% fatty acid salt and 11% choline chloride.

The aqueous dilutions described herein may comprise the components of the pesticidal composition in any suitable amount. In some embodiments, the active ingredient (e.g., free fatty acids or unionized fatty acid mixture) comprises from about 0.001% to about 10% (e.g., 0.005% to 5%, 0.005% to 1%, 0.01% to 5%, 0.1% to 5%, 0.1% to 3%, 0.5% to 3%, 1% to 3%, 1% to 2%, about 0.005%, about 0.01%, about 0.1%, about 0.5%, about 1%, about 1.5%, about 2%, about 2.5%, about 3%, about 4%, or about 5%) by weight of the aqueous dilution. In one embodiment, the active ingredient comprises from about 0.005% to about 1% by weight of the aqueous dilution. In another embodiment, the active ingredient comprises about 1% by weight of the aqueous dilution.

In some embodiments, the emulsifier (e.g., fatty acid sodium salt mixture) comprises from about 0.001% to about 10% (e.g., 0.005% to 5%, 0.005% to 4%, 0.01% to 5%, 0.1% to 5%, 0.1% to 3%, 0.5% to 3%, 1% to 3%, 1% to 2%, about 0.005%, about 0.01%, about 0.1%, about 0.5%, about 1%, about 1.5%, about 2%, about 2.5%, about 3%, about 4%, or about 5%) by weight of the aqueous dilution. In one embodiment, the emulsifier comprises from about 0.005% to about 5% by weight of the aqueous dilution. In another embodiment, the emulsifier comprises about 4% by weight of the aqueous dilution. In another embodiment, the emulsifier is present in the dilution at a concentration 4 times higher than that of the active ingredient. For example, the active ingredient (e.g., free fatty acid mixture) may be present at 1% by weight of the aqueous dilution, and the emulsifier (e.g., fatty acid sodium salt mixture) may be present at 4% by weight of the aqueous dilution.

In some embodiments, the adjuvant (e.g., choline chloride) comprises from about 0.001% to about 10% (e.g., 0.005% to 5%, 0.005% to 1%, 0.01% to 5%, 0.1% to 5%, 0.1% to 3%, 0.5% to 3%, 1% to 3%, 1% to 2%, about 0.005%, about 0.01%, about 0.1%, about 0.5%, about 1%, about 1.5%, about 2%, about 2.5%, about 3%, about 4%, or about 5%) by weight of the aqueous dilution. In one embodiment, the adjuvant comprises from about 0.005% to about 5% by weight of the aqueous dilution. In another embodiment, the adjuvant comprises from about 0.005% to about 1% by weight of the aqueous dilution. In another embodiment, the adjuvant comprises about 1% by weight of the aqueous dilution.

In some embodiments, the carrier (e.g., an aqueous emulsion or water) comprises from about 1% to about 99.975% (e.g., 10% to 99.975%, 50% to 99.975%, 60% to 99.975%, 70% to 99.975%, 80% to 99.975%, 90% to 99.975%, or 94% to 99.975%) by weight of the aqueous dilution. In one embodiment, the carrier comprises from about 94% to about 99.975% by weight of the aqueous dilution. In some embodiments, the carrier makes up the remaining balance of the aqueous dilution after the other pesticidal composition components (e.g., the active ingredients, the emulsifier, and the adjuvant) are adjusted to the desired concentration.

V. Methods of Using the Pesticidal Compositions

In another aspect, provided herein is a method for incapacitating or killing an insect or arthropod comprising contacting the insect or arthropod with the pesticidal composition described herein. In some embodiments, the insect or arthropod is selected from the group consisting of mosquitoes, cockroaches, house flies, stable flies, horn flies, horse flies, face flies, eye flies, biting midges, and ticks. In some embodiments, the insect or arthropod is resistant to permethrin.

Also provided herein is a method for treating an animal to protect against biting insects or arthropods comprising applying the pesticidal composition described herein to the animal. In some embodiments, the animal is a livestock animal (e.g., a horse, a cow, a pig, a goat, a sheep, or a chicken). In some embodiments, the animal is a cow. In some embodiments, applying the pesticidal composition to the animal comprises the use of a manual or automatic sprayer. In some embodiments, applying the composition to a cow comprises the use of an automatic cattle sprayer.

Figure 15:
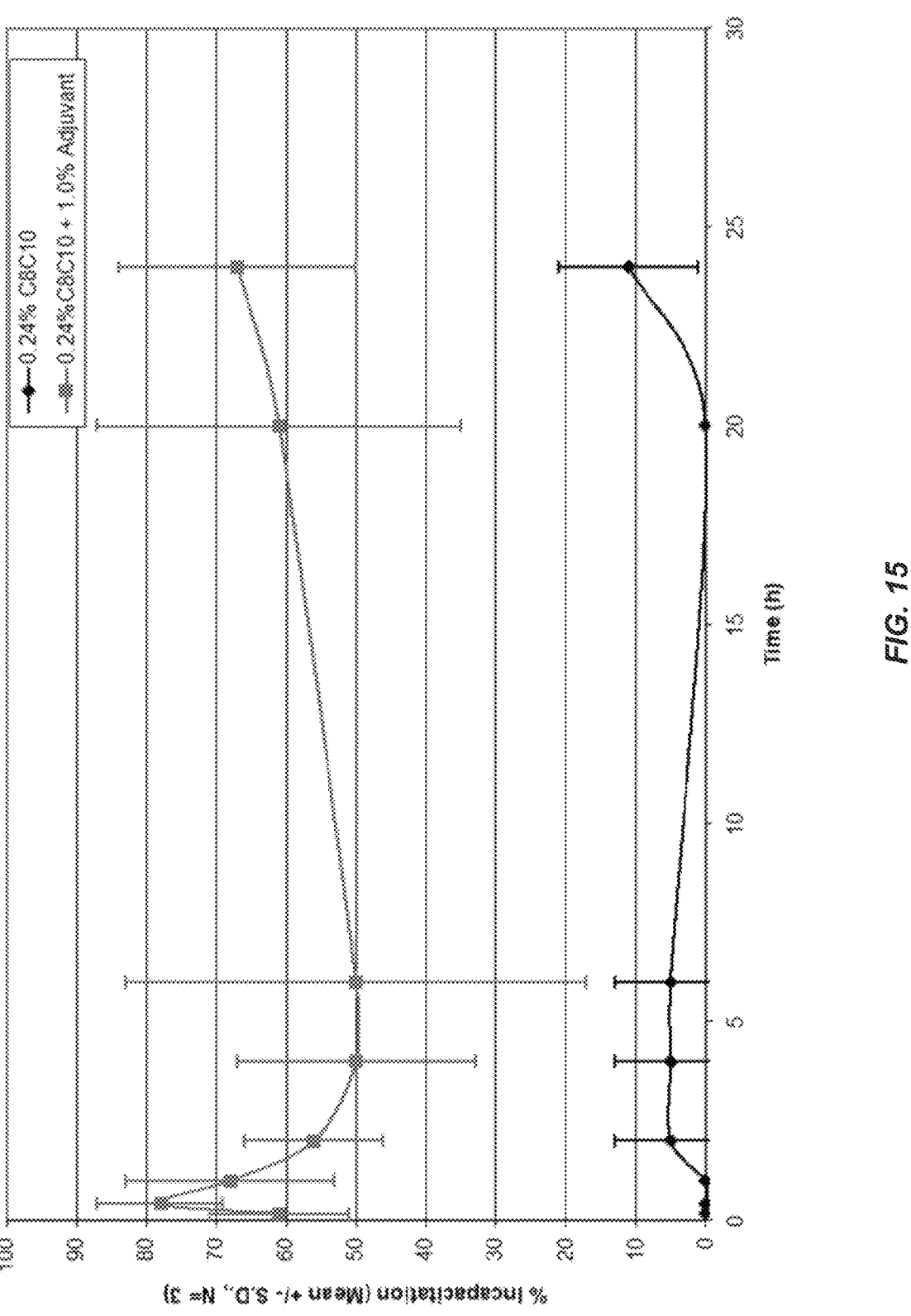
FIG. 15 shows a laboratory assay of German cockroach incapacitation (mean+/−S.D.) following exposure to 0.24% C8C10 (mix of octanoic and decanoic acids) in aqueous emulsion with and without 1.0% adjuvant (choline chloride), according to certain aspects of this disclosure.
Figure 16:
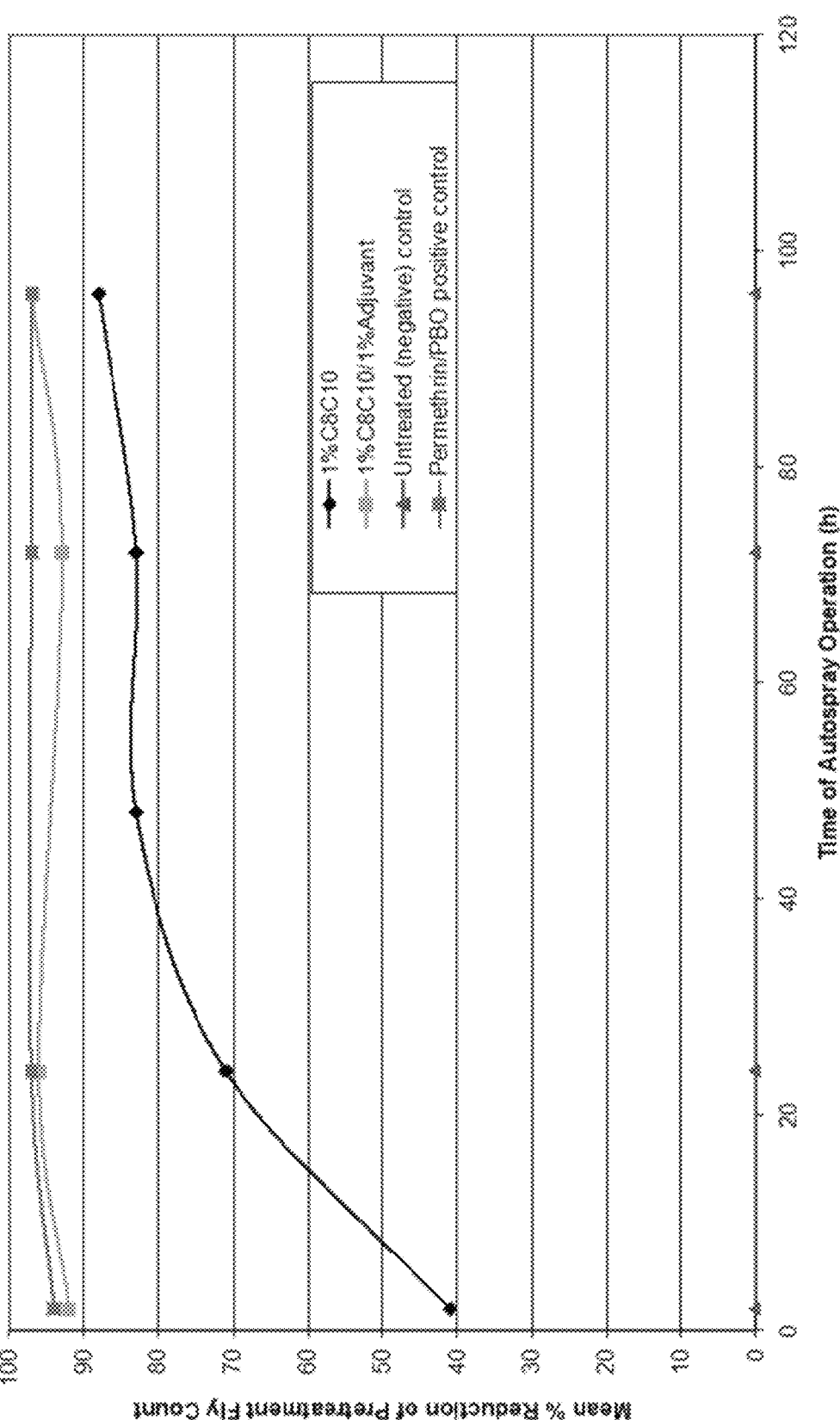
FIG. 16 shows the results of a field trial of 1% C8C10 (mix of octanoic and decanoic acids) in aqueous emulsion with and without 1.0% adjuvant (choline chloride) vs native horn flies on cattle using an automatic sprayer (N=6 for each group), according to certain aspects of this disclosure.

As demonstrated in the Examples herein, the addition of choline chloride to the fatty acid formulations resulted in increased levels of insect incapacitation for stable flies, horn flies, house flies and cockroaches (Examples 4-8 and FIGS. 4-12, 14-16). Increasing the choline chloride concentration relative to the free fatty acid (FFA) concentration resulted in increased levels of insect incapacitation (Tables 4-7). The field trial vs. horn flies confirmed the laboratory results (FIG. 16). In this field trial, autospray treatments of fatty acid alone (1% C8C10), 1% fatty acid plus 1% choline chloride, and permethrin/PBO (positive control) were compared to an untreated or negative control, with fly counts at 2, 24, 48, 72, and 96 hours during the 96 hours of autosprayer operation. As shown in FIG. 16, the fatty acid/adjuvant combination was superior to fatty acid alone and was equivalent to permethrin/PBO. After treatments ceased at 96 hours, 4 days after initiation of treatment, fly counts were made 7 days later to judge residual effect. As expected, mean fly counts for the fatty acid/choline chloride treatment increased to 175 (from 8 at 96 hours when treatment ceased). However, the corresponding fly count for permethrin/PBO was 323, which approached the untreated control (376), indicating the residual effect of fatty acid/choline chloride treatment was superior to permethrin/PBO.

An examination of the time course of insect incapacitation after low to intermediate concentrations of the fatty acid mixes showed that insect incapacitation of certain insects was reversible (see FIGS. 4, 5, 8, and 14). At higher fatty acid doses, the degree of incapacitation was overwhelming and caused long lasting incapacitation, tantamount to insect death (e.g. FIG. 6). After the exposure of the subject fatty acids to certain insects, while not being bound by theory, it is hypothesized that they reversibly react with endogenous choline to form choline esters. Acetylcholine, an ester formed from the 2 carbon carboxylic acid, acetic acid, is necessary for normal nerve conduction in animals. It has been shown (Keyl et al., 1957) that longer chain fatty acid choline esters (butyric acid or C4, valeric acid or C5, and caproic acid or C6) can interact with acetylcholine receptors, with a relative potency that declines with chain length; that is, on a relative potency scale where acetylcholine is 100, C4 is also 100, C5 is 54, and C6 is 20. While not being bound by theory, C8 and C10 choline esters may reversibly compete with acetylcholine at its receptors. And since the potency of these esters may be significantly lower than acetylcholine because of longer chain length, normal nerve conduction is disrupted. Consistent with this hypothesis, the addition of choline to lower doses of the C8C10 fatty acid mix may cause greater formation of the corresponding choline esters and enhancement of insect incapacitation. Chemical analysis by NMR (Emery Oleochemicals, personal communication, Ciolino, 2019) of the 1% C8C10/1% choline chloride formulation indicated the choline remained unesterified, suggesting that esterification occurred after insect exposure, catalyzed by endogenous esterases.

The ability of C810 to incapacitate permethrin sensitive vs. resistant (Kdr) horn flies can be compared with the data in Table 5. Except for the very lowest (0.005%) and highest concentration (1.00%) of C810, these fatty acids were better able to incapacitate the sensitive strain vs. the Kdr strain (row 4, 24% vs. 10%; row 6, 38% vs 8%; row 8, 77% vs 58%). These data suggest a common mechanism (inhibition of insect nerve conduction) may exist between these two pesticidal chemistries.

The highest ratio of horn fly incapacitation at 24 hours, with/without choline chloride (51%/8%=6.4), occurred at the intermediate concentration (0.01%) of C8C10 and at the highest concentration (1%) of choline chloride. The addition of choline chloride to C8C10 essentially abolished the differences in C8C10 incapacitation between the sensitive and resistant strains. Without being bound by theory, these results suggest a specific effect of the choline chloride adjuvant.

A synthetic based formulation at a free fatty acid (FFA) concentration of 0.02% of octanoic, nonanoic, and decanoic acids (Table 6) gave results that were similar to the lowest FFA concentration (0.005%) of the organic based formulation (row 2, Table 5) and no significant efficacy differences were observed comparing sensitive and Kdr strains of horn flies (Table 6). The difference in results may be due to the formulation components (2 fatty acid mix vs. 3 fatty acid mix or other formulation components), but when making strain comparisons, the results point to the need to make comparisons at multiple concentration levels, particularly at intermediate levels of efficacy.

Figure 13:
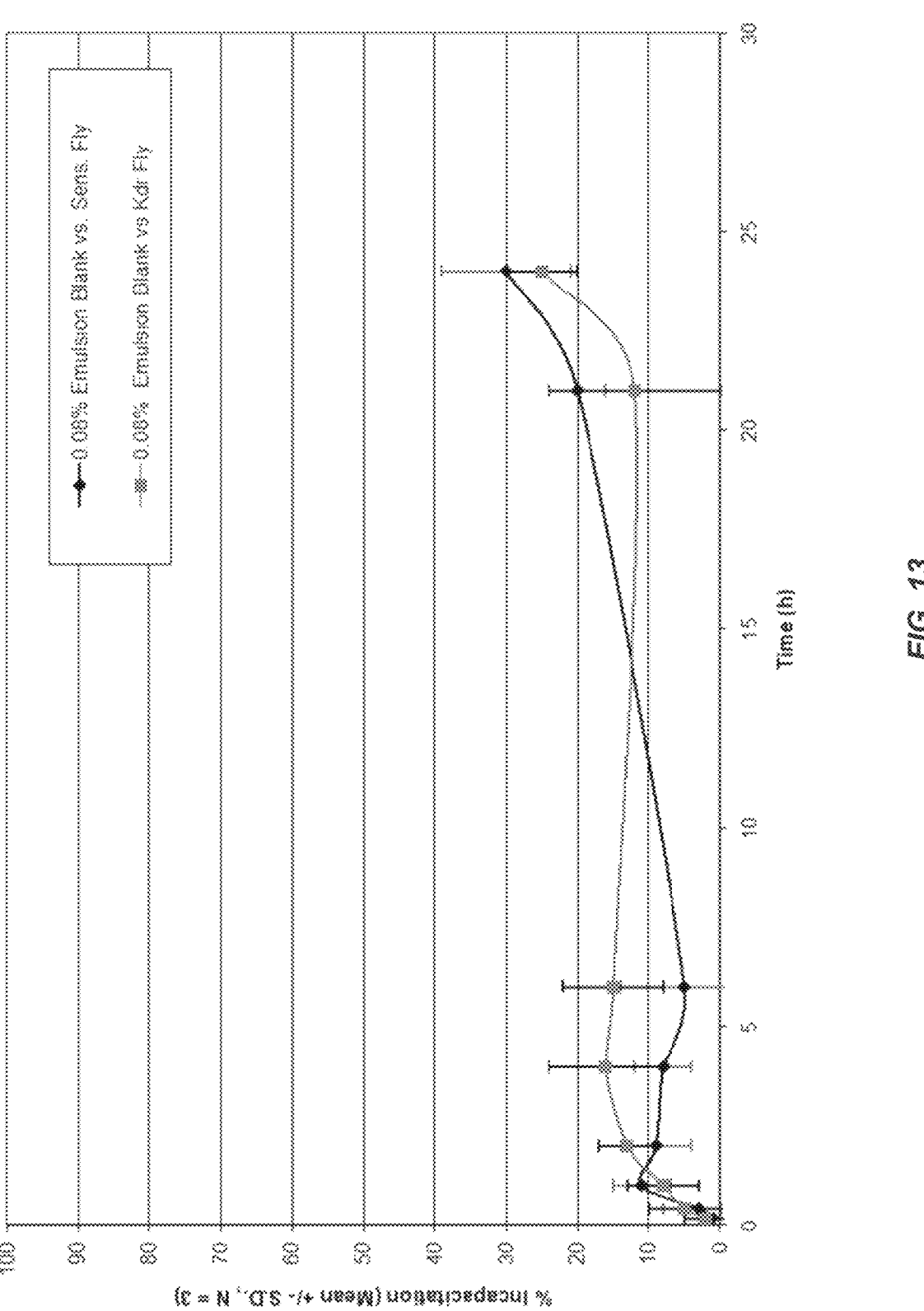
FIG. 13 shows a laboratory assay of sensitive and resistant (Kdr) horn fly incapacitation (mean+/−S.D.) following exposure to 0.08% emulsion blank (mix of sodium salts of octanoic and decanoic acids), according to certain aspects of this disclosure.
Figure 14:
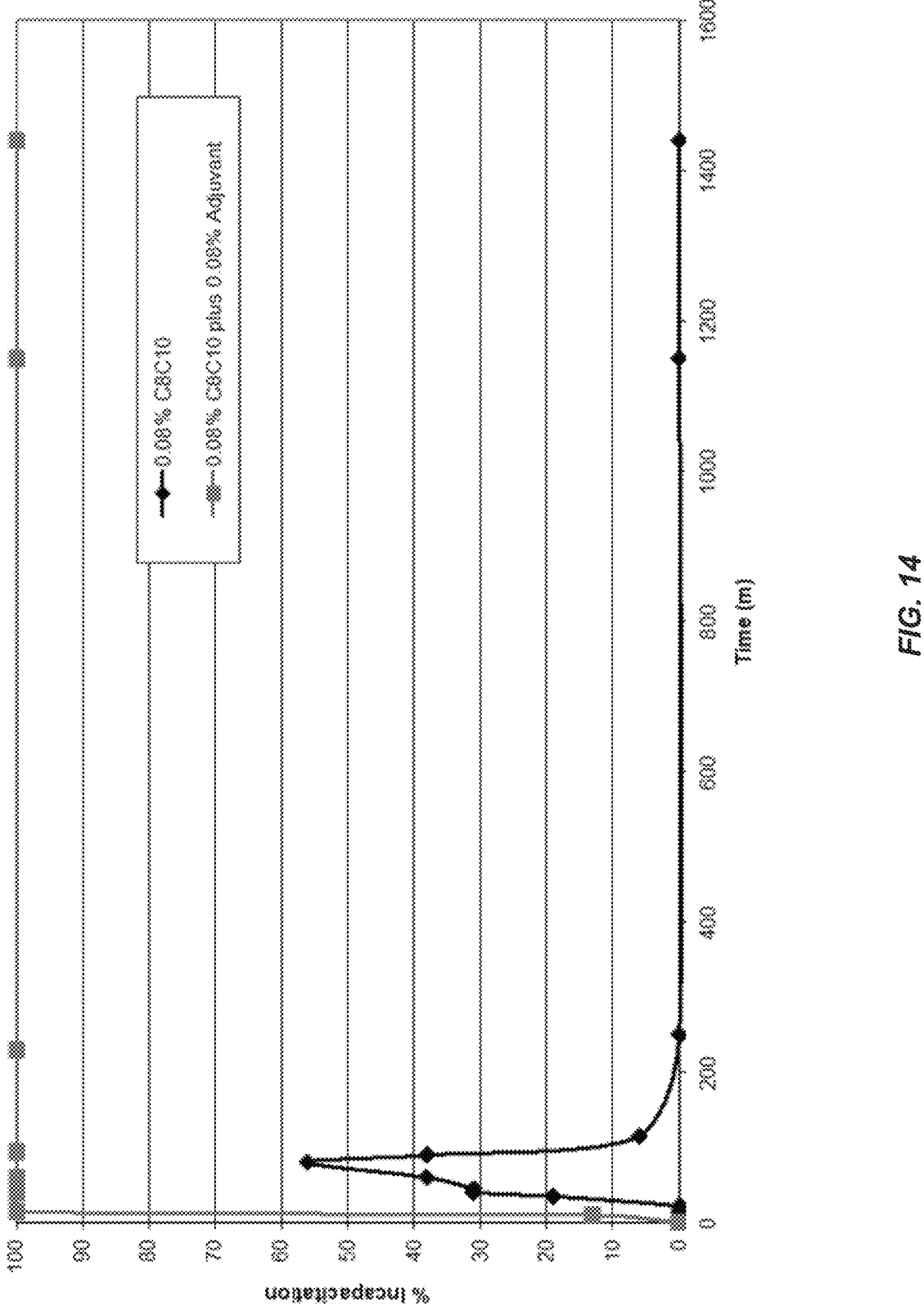
FIG. 14 shows a time course of house fly incapacitation following exposure to 0.08% C8C10 (mix of octanoic and decanoic acids) in aqueous emulsion with and without 0.08% adjuvant (choline chloride), according to certain aspects of this disclosure.

The emulsifier used in the organic formulations of C8C10, sodium salts of octanoic and decanoic acids, exerted only a small level of incapacitation on horn flies (FIG. 13), consistent with the notion that the unionized or free fatty acids are necessary for insect incapacitation.

It has been reported that medium chain fatty acid esters had strong toxicity against stable flies (Roh, G. H. et al., 2019). Since it has been shown that the free fatty acid form of fatty acids is essential for their activity (Siegler, E. H. and Popenoe, C. H, 1925), the activity of the esters is likely due to the formation of the corresponding free fatty acids by hydrolysis, catalyzed by enzymatic or other mechanisms (e. g. extensive hydrolysis of the diethyl ester of the fatty acid malonic acid on contact with skin; Chellquist E. M. and Reifenrath, W. G., 1988). Since choline chloride enhances the insecticidal activity of free fatty acids, as demonstrated herein, it follows that it would do the same for the precursor of fatty acids, namely esters.

VI. Examples

Example 1. This Example Describes a Study of C8910 Formulation on Native Horn Flies in West Central Nebraska A study was performed to evaluate the effectiveness of E8700, a water-based formulation of C8910, on controlling native horn flies in west central Nebraska when applied to cattle using a low pressure sprayer. The study was performed by David J. Boxler, Investigator, Extension Educator-Entomology, University of Nebraska West Central Research & Extension Center, North Platte, NE 69101. The study location was the University of Nebraska-Lincoln, West Central Research & Extension Center, 402 West State Farm Rd, North Platte, NE 69101.

Procedure: yearling heifers located at the West Central Research & Extension Center, North Platte, NE were selected for use in this evaluation. Cattle grazed in separate native range pastures approximately 17 acres in size. Pasture separation was accomplished with high tensile electric fencing. The first application of formulation E8700 was made on Sep. 13, 2016 using a small hand pump sprayer calibrated to deliver 500 mL of a 1% concentration per animal. To insure complete spray coverage all animals were restrained in a cattle chute. Spray was applied to the animal's top line, sides, belly, and legs. Upon completion of the application, all animals were kept in a holding pen until returned to their respective pasture.

Assessment of the number of horn flies per animal in each treatment group was made 2 hours post-treatment and for the next 3 days. This assessment was made using digital photographs of one side of all six animals in each treatment group between the hours of 08:00 and 11:00 AM. These images were then viewed using a computer imaging program GIMP 2.6.11, GNV Image Manipulation Program. The fly count for each image was doubled to express the total number of flies per animal.

All fly count data were log transformed, and analyses were conducted on this variable. Repeated Measures and Least Square Means in GLIMMIX (SAS Institute 9.2) was used to determine effects of treatment and fly population numbers. A P-value≤0.05 was considered significant. Reduction (%) in fly numbers vs. control was calculated weekly by subtracting the treatment mean fly count from the control for that week and dividing the result by control count.

Week 1 Results: Overall, E8700 applied during week 1 (9/13-9/16) significantly reduced horn fly numbers (Table 2A, FIG. 3). Horn fly numbers on E8700 sprayed cattle slightly exceeded the Economic Injury Level (EIL) on day 3 and 4 post treatment. Overall, horn fly numbers were reduced by 77% for the first spray period.

Week 2 Results: Overall, E8700 applied during week 2 (9/20-9/23) significantly reduced horn fly numbers (Table 2B, FIG. 3), but fly numbers surpassed the EIL on day 2 post treatment. Overall, horn fly numbers were reduced by 77%, consistent with Week 1 reduction.

Figure 3:
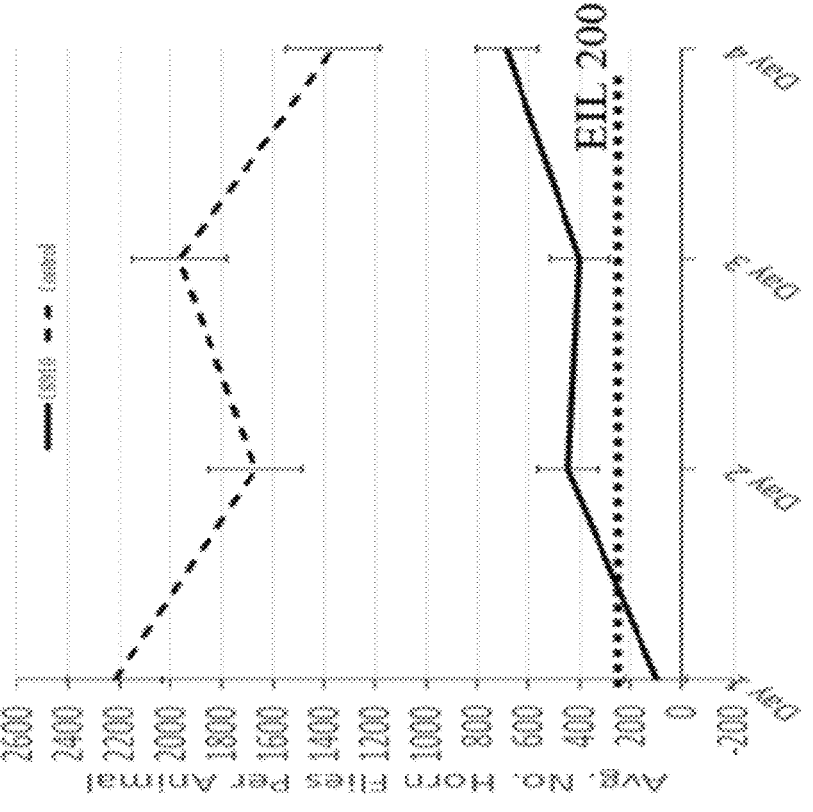
FIG. 3 shows the effect of E8700, a water-based formulation of C8910, on native horn fly numbers during week 1 (left) and week 2 (right) of field evaluation (Mean+/−S.D).
Figure 3:
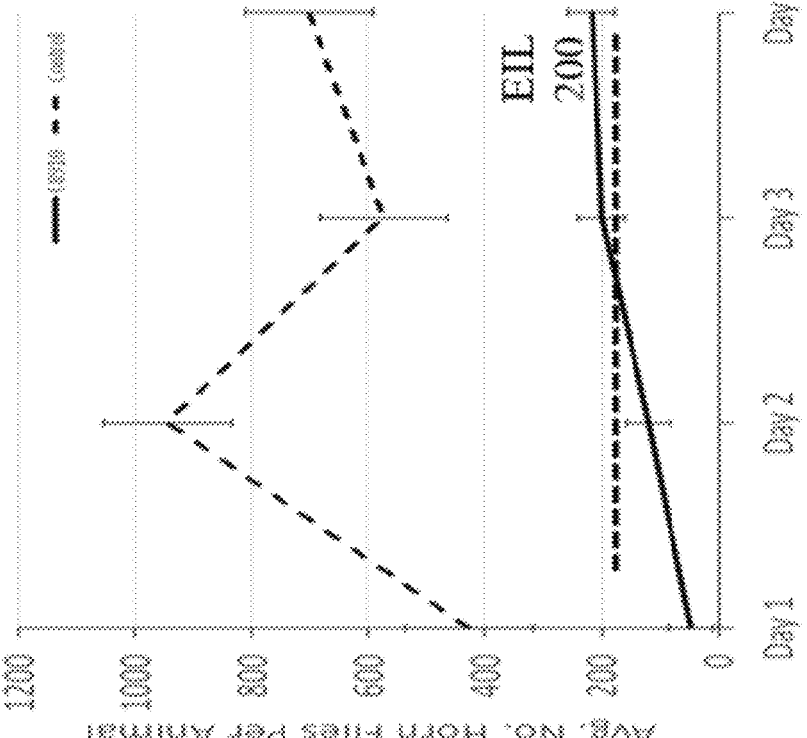
Figure 4:
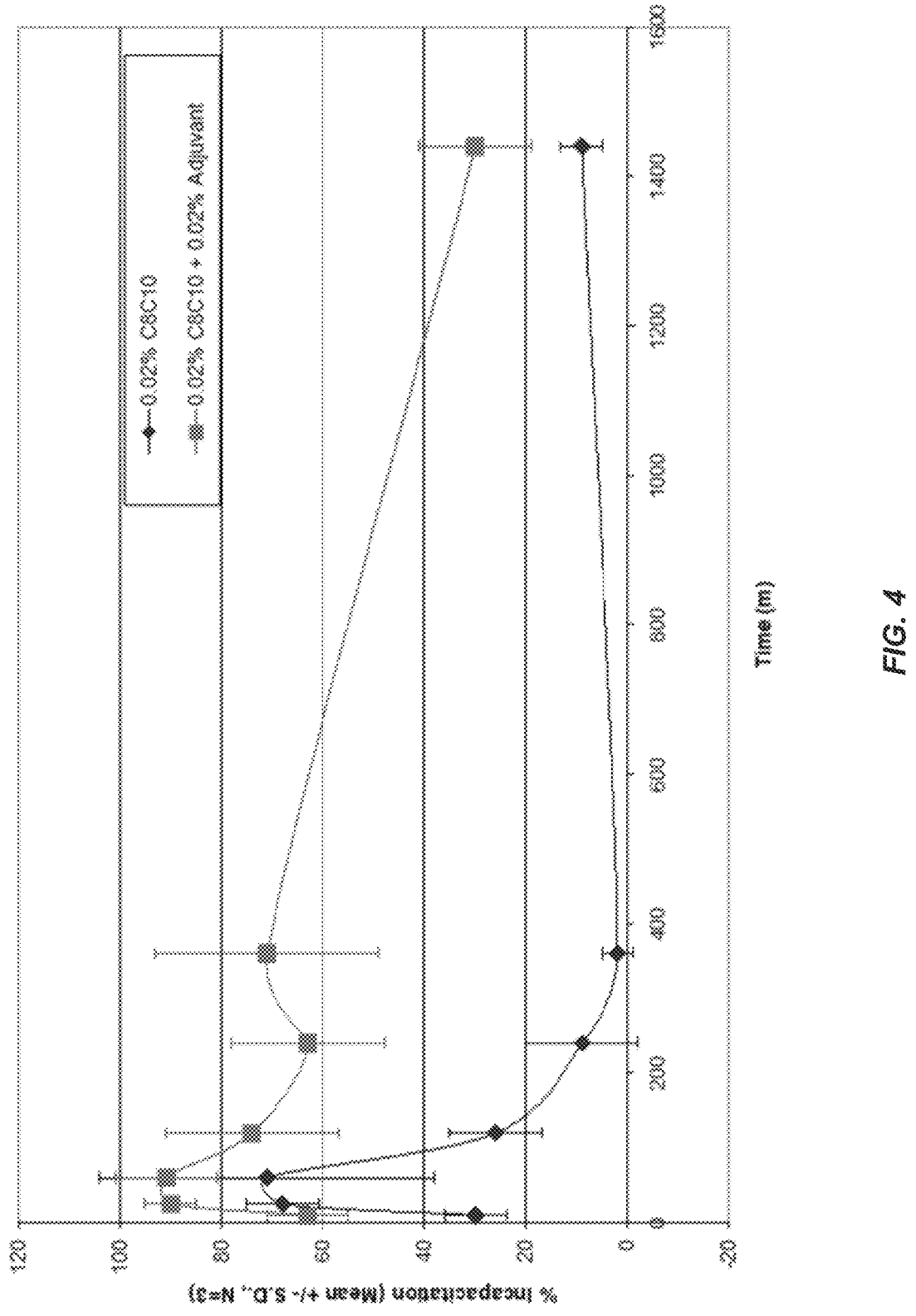
FIG. 4 shows stable fly incapacitation (mean+/−S.D.) following exposure to 0.02% C8C10 (mix of octanoic and decanoic acids) in aqueous emulsion with and without 0.02% adjuvant (choline chloride), according to certain aspects of this disclosure.
Figure 5:
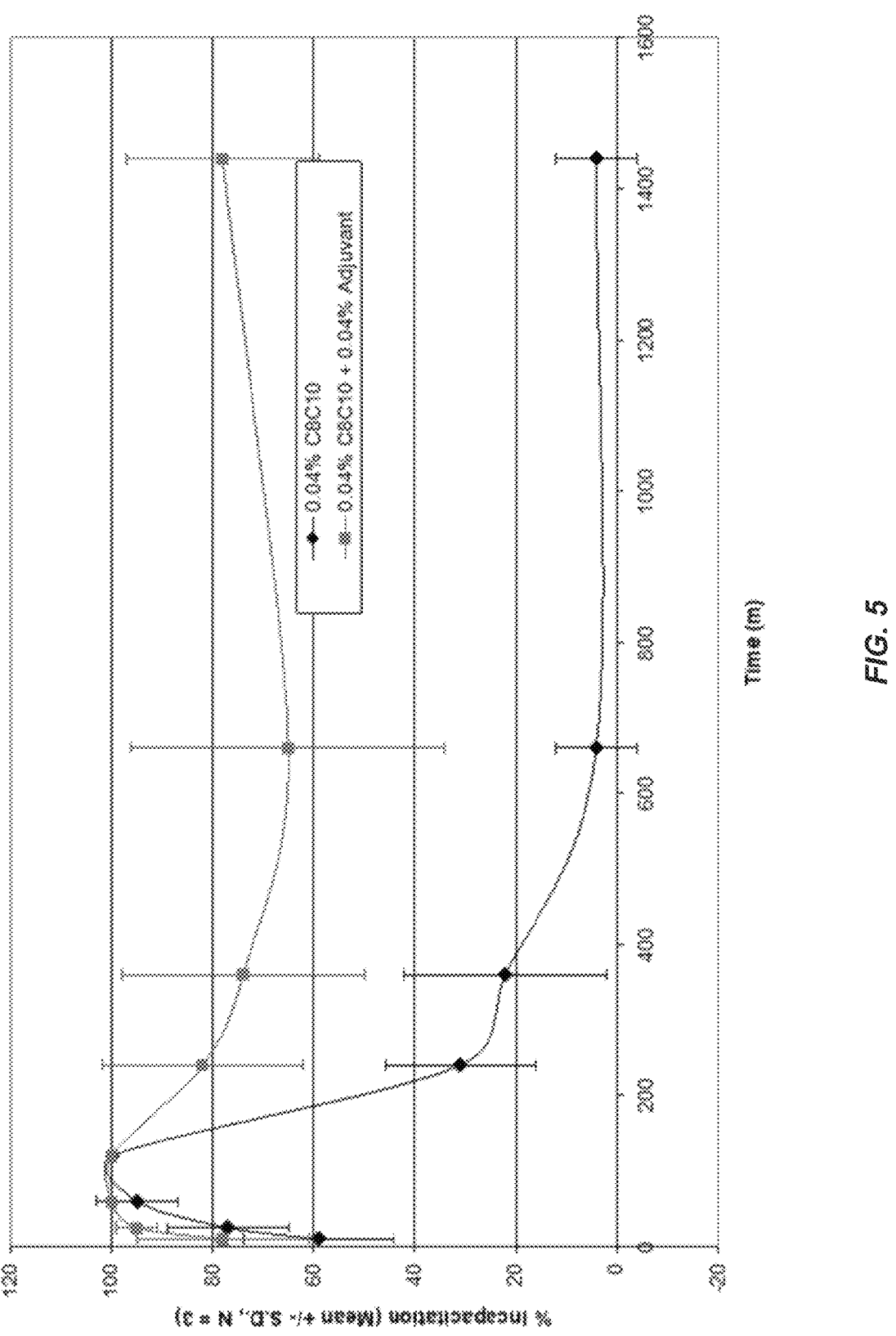
FIG. 5 shows stable fly incapacitation (mean+/−S.D.) following exposure to 0.04% C8C10 (mix of octanoic and decanoic acids) in aqueous emulsion with and without 0.04% adjuvant (choline chloride), according to certain aspects of this disclosure.
Figure 6:
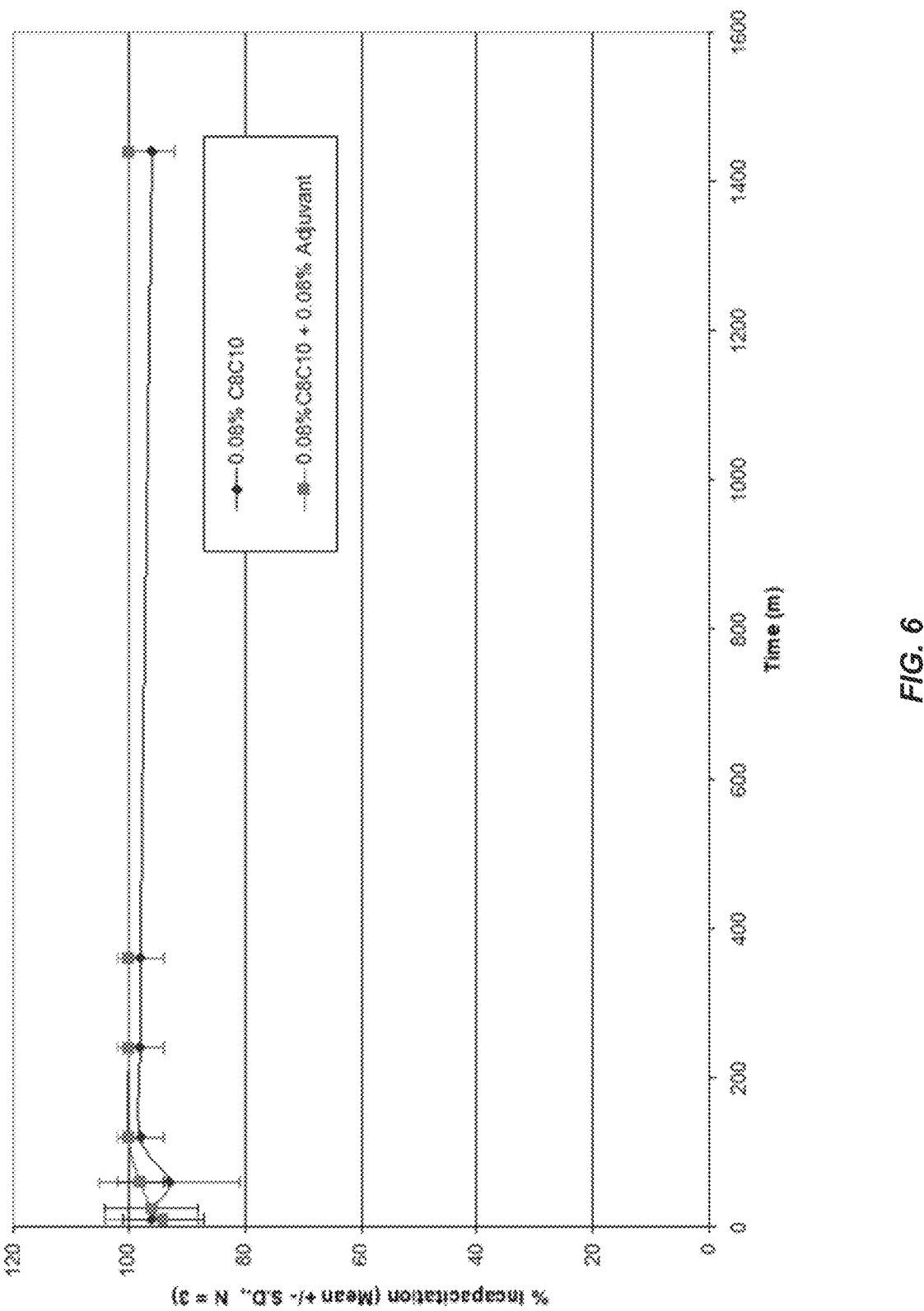
FIG. 6 shows stable fly incapacitation (mean+/−S.D.) following exposure to 0.08% C8C10 (mix of octanoic and decanoic acids) in aqueous emulsion with and without 0.08% adjuvant (choline chloride), according to certain aspects of this disclosure.
Figure 7:
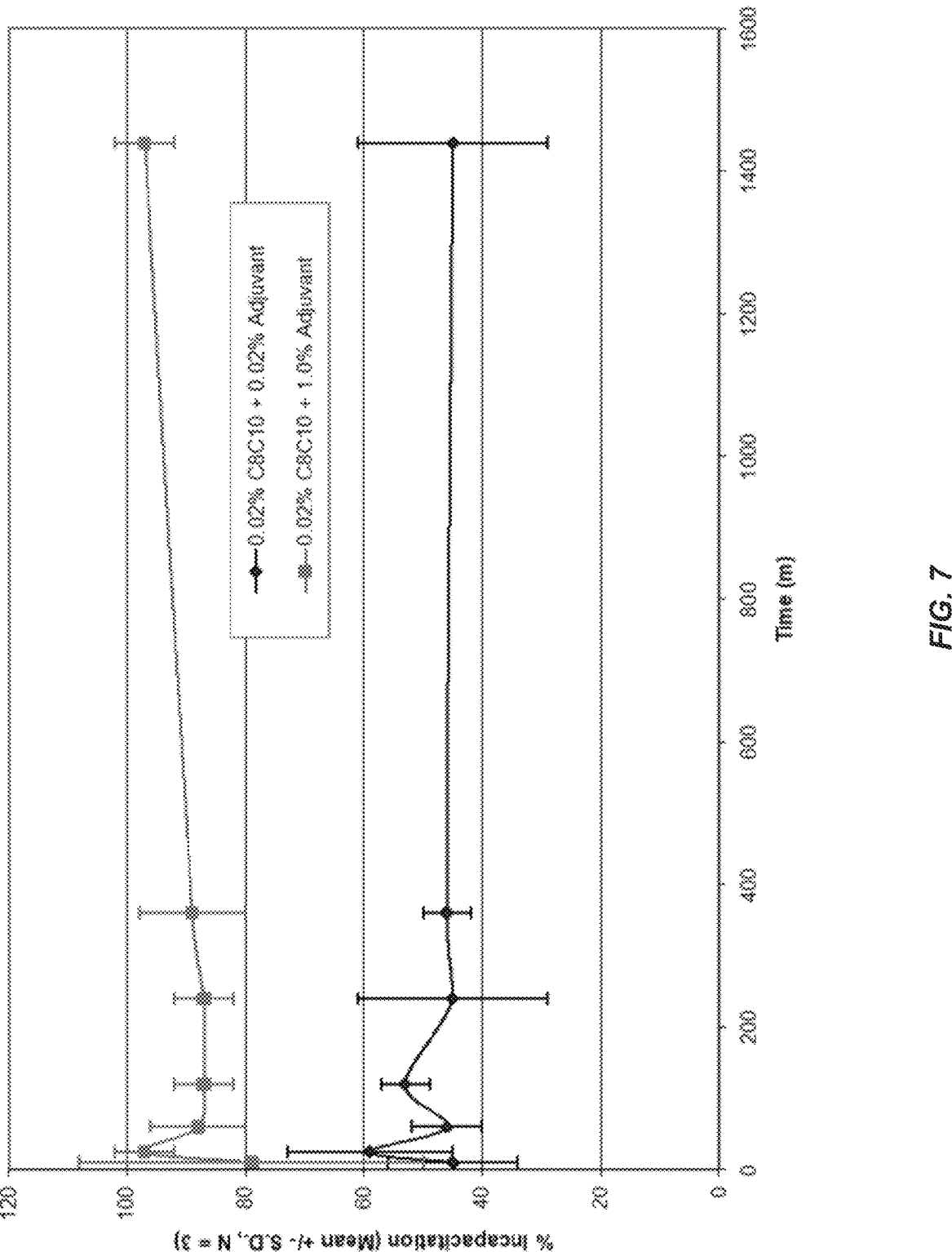
FIG. 7 shows stable fly incapacitation (mean+/−S.D.) following exposure to 0.02% C8C10 (mix of octanoic and decanoic acids) in aqueous emulsion with 0.02% or 1.0% adjuvant (choline chloride), according to certain aspects of this disclosure.
Figure 8:
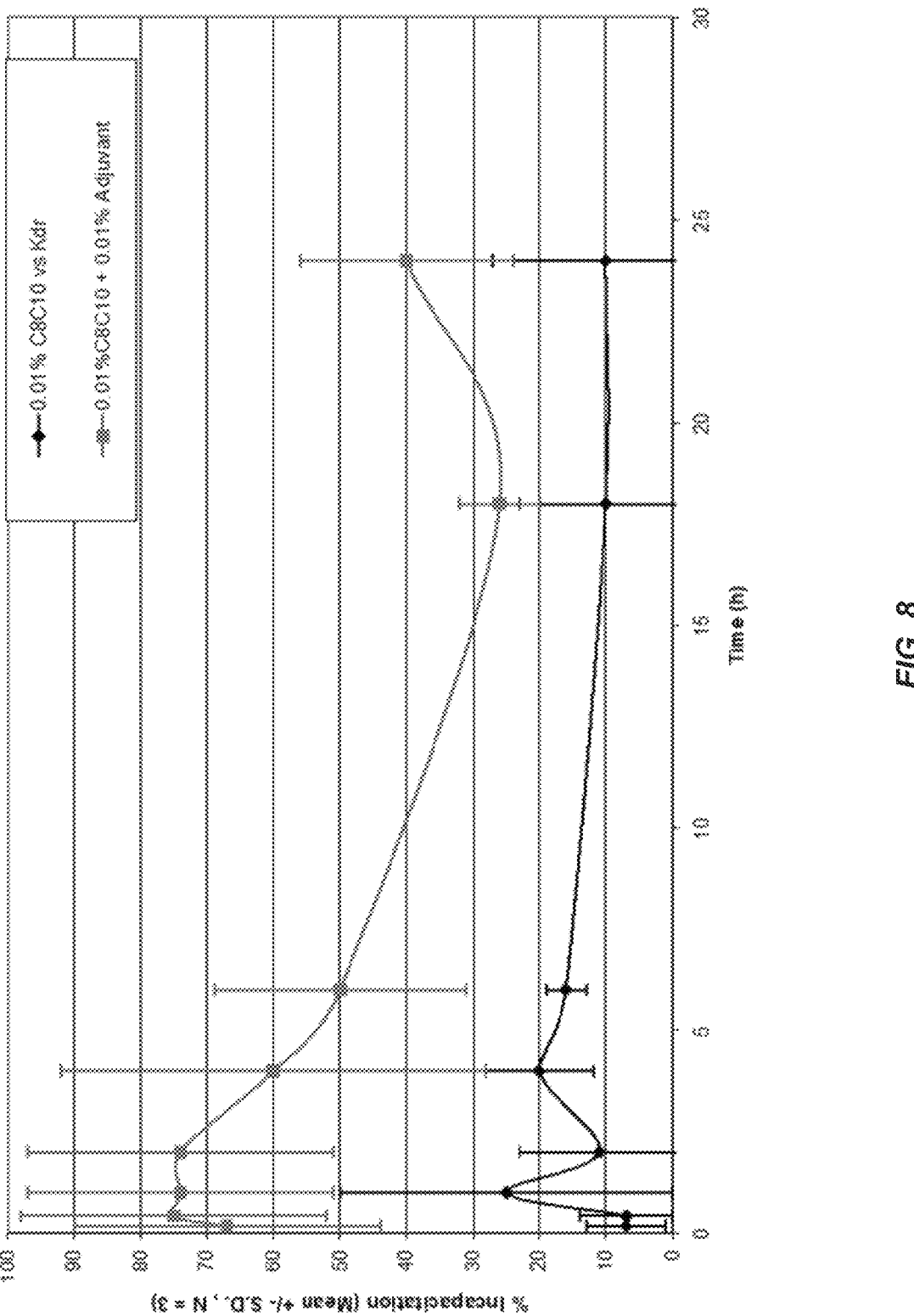
FIG. 8 shows a laboratory assay of horn fly (resistant Kdr strain) incapacitation (mean+/−S.D.) following exposure to 0.01% C8C10 (mix of octanoic and decanoic acids) in aqueous emulsion with and without 0.01% adjuvant (choline chloride), according to certain aspects of this disclosure.
Figure 9:
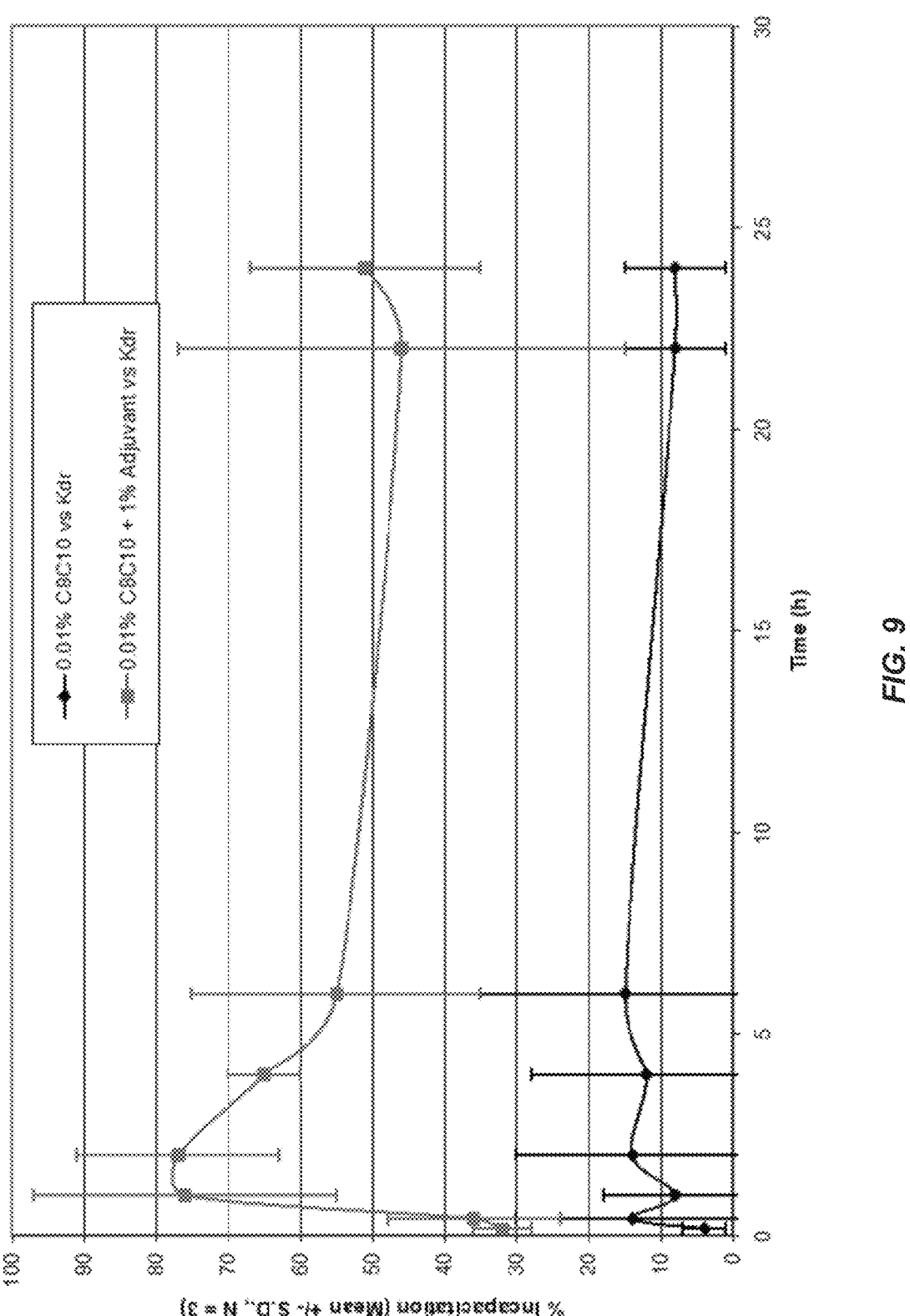
FIG. 9 shows a laboratory assay of horn fly (resistant Kdr strain) incapacitation (mean+/−S.D.) following exposure to 0.01% C8C10 (mix of octanoic and decanoic acids) in aqueous emulsion with and without 1.0% adjuvant (choline chloride), according to certain aspects of this disclosure.
Figure 10:
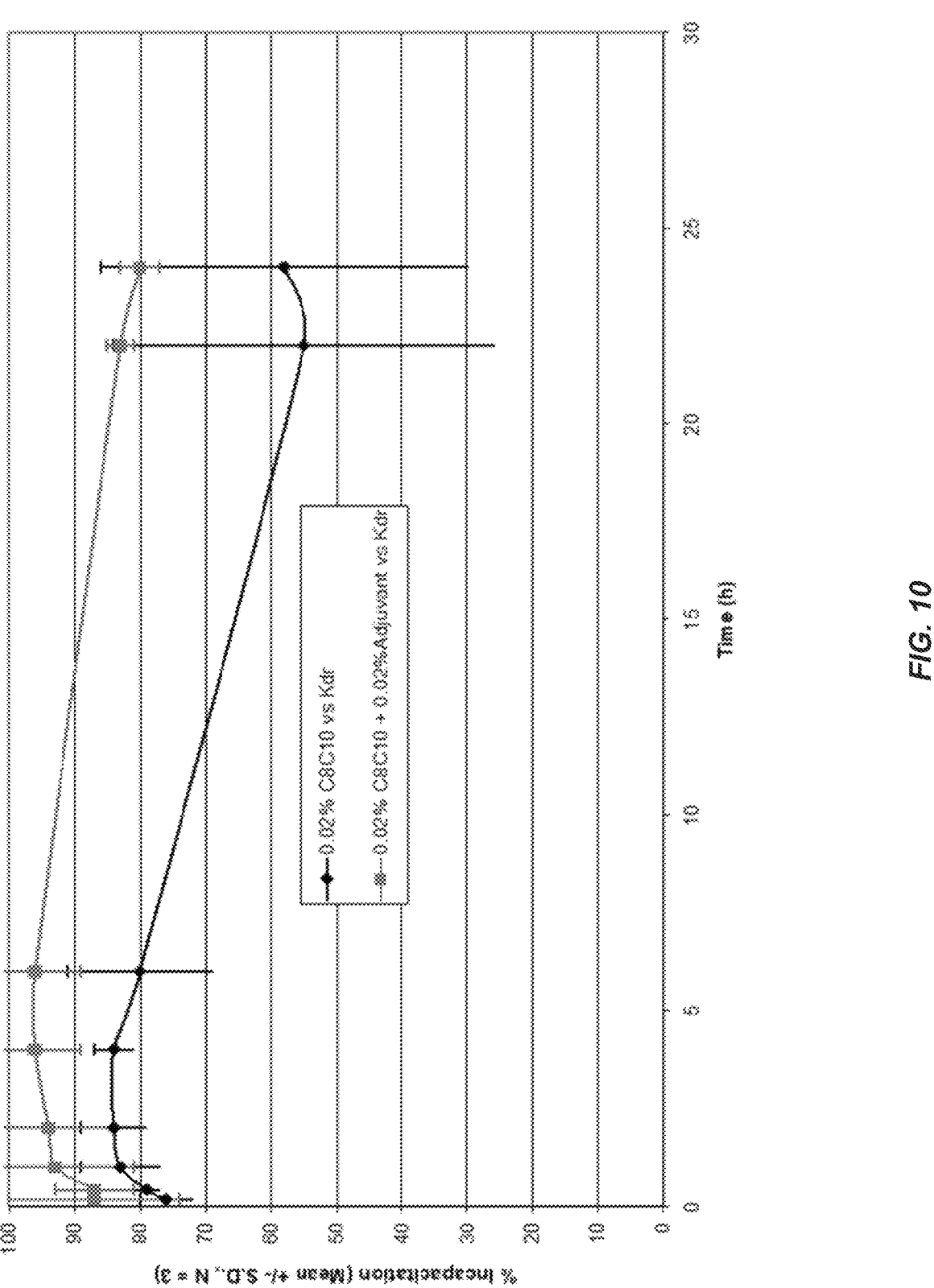
FIG. 10 shows a laboratory assay of horn fly (resistant Kdr strain) incapacitation (mean+/−S.D.) following exposure to 0.02% C8C10 (mix of octanoic and decanoic acids) in aqueous emulsion with and without 0.02% adjuvant (choline chloride), according to certain aspects of this disclosure.
Figure 11:
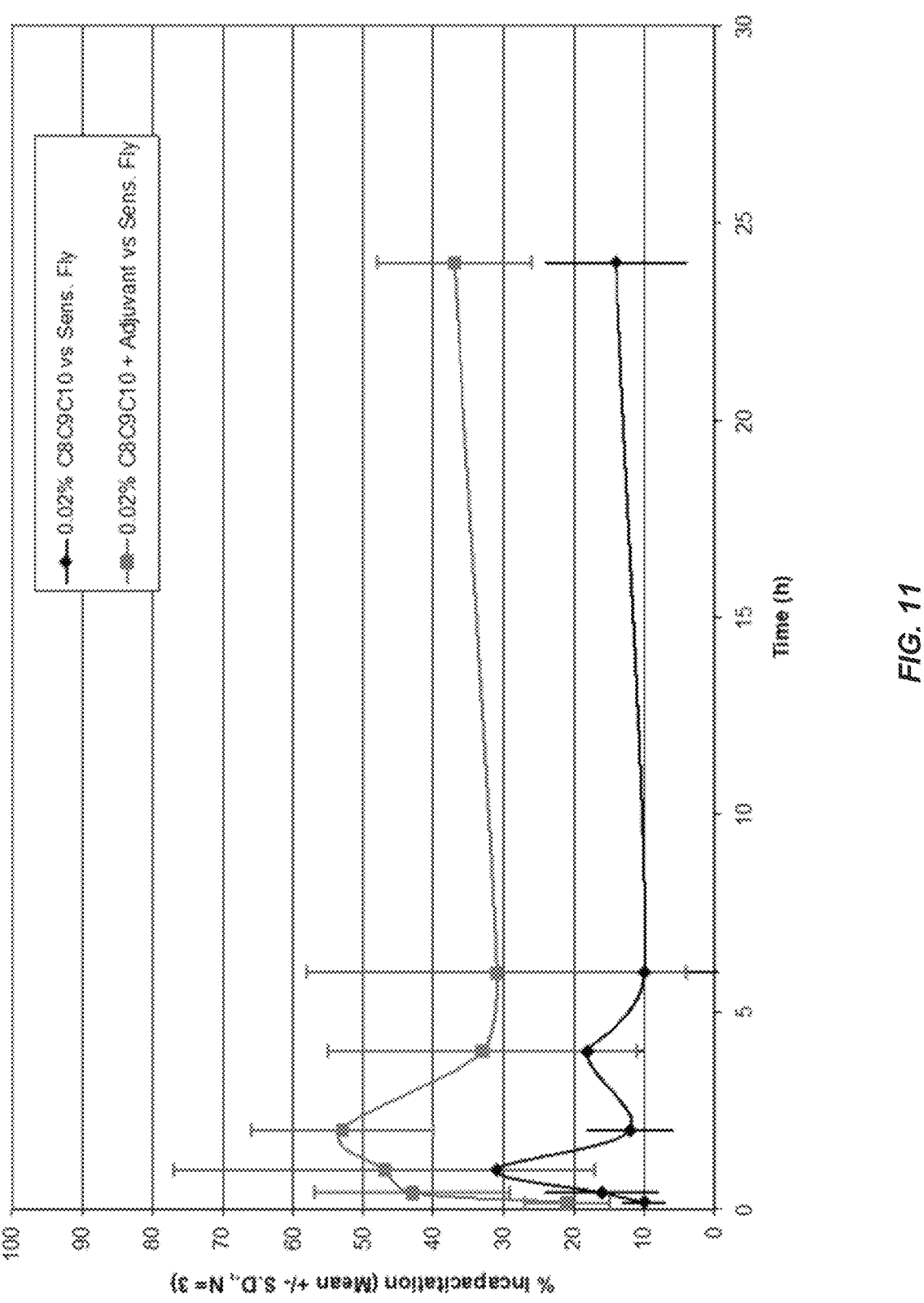
FIG. 11 shows a laboratory assay of sensitive horn fly incapacitation (mean+/−S.D.) following exposure to 0.02% C8C9C10 (mix of octanoic, nonanoic, and decanoic acids) in aqueous emulsion (synthetic) with and without 0.02% adjuvant (choline chloride), according to certain aspects of this disclosure.
Figure 12:
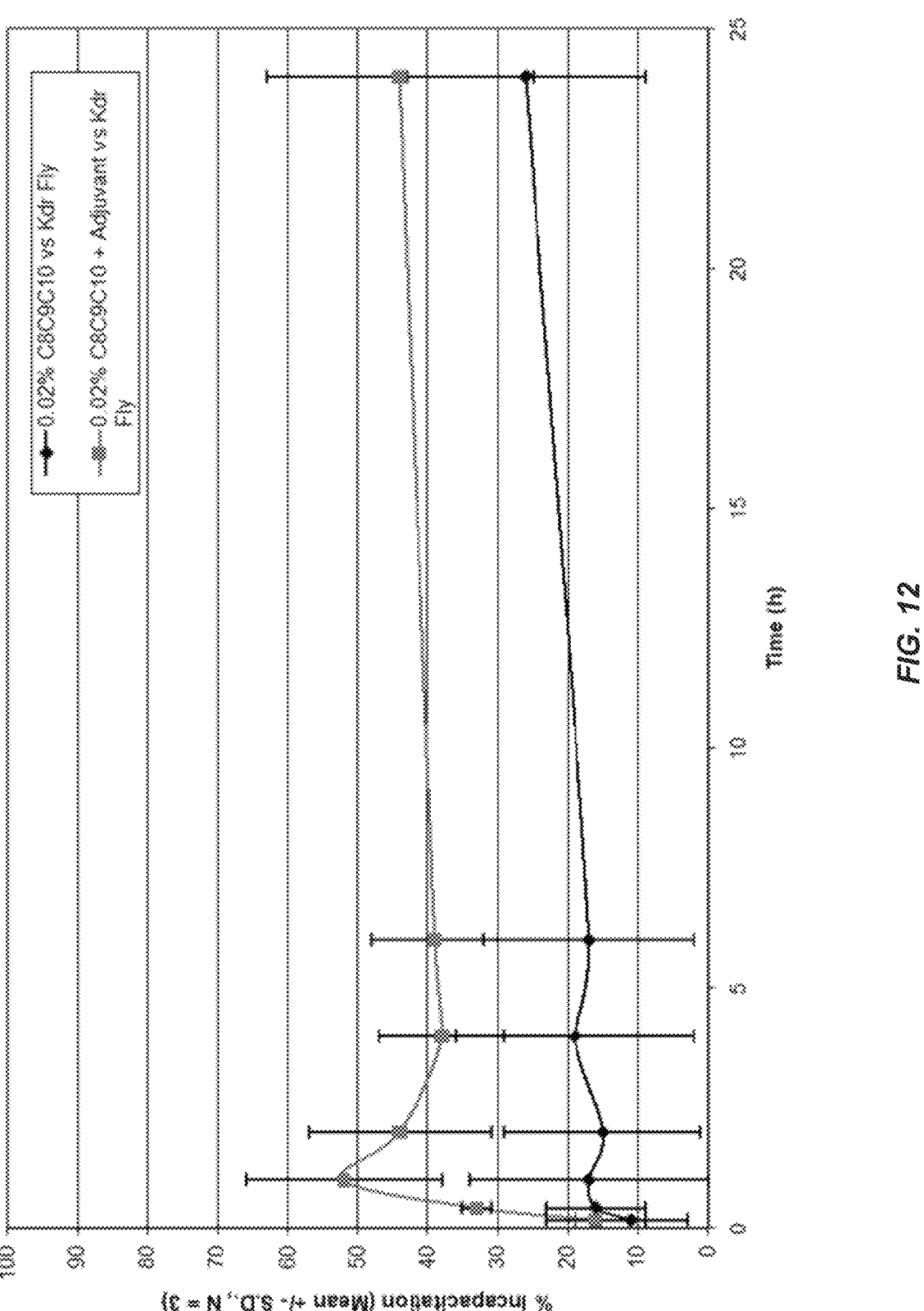
FIG. 12 shows a laboratory assay of resistant horn fly (Kdr strain) incapacitation (mean+/−S.D.) following exposure to 0.02% C8C9C10 (mix of octanoic, nonanoic, and decanoic acids) in aqueous emulsion (synthetic) with and without 0.02% adjuvant (choline chloride), according to certain aspects of this disclosure.

FIG. 3 clearly contrasts horn fly numbers observed on animals treated with E8700 versus fly numbers on the control (untreated) animals after Week 1 and 2 treatments (Means+/−S.D.). No adverse reactions were observed on E8700 treated cattle. Pretreatment counts were almost identical, assuring that the Control and Treatment groups were equivalent initially. Percent reductions were calculated based on Control fly numbers at the same point in time, as Control fly numbers varied substantially over the course of this study, as is typical for field trials; it would be misleading to calculate reductions solely on pretreatment numbers.

TABLE 2A

Horn fly counts and percent change in fly numbers on cattle treated with E8700 water-based formulation of C8910, week 1.

| Day Observed | Control Mean No. flies 77 (Pretreatment) | E8700 Mean No. flies 556 (Pretreatment) | Percent Reduction |
|---|---|---|---|
| 0 | | | |
| 1* | 428 | 48 | 88 |
| 2 | 946 | 121 | 87 |
| 3 | 575 | 201 | 65 |
| 4 | 703 | 218 | 69 |
| Overall Mean** | 663a | 147b | 77 |

*Fly count recorded 2 hours post-treatment.
**Means followed by the same letter within the same row are not significant different (P > 0.05).

TABLE 2B

| | Horn fly counts and percent change in fly numbers on cattle treated with E8700 water-based formulation of C8910, week 2. | | |
|---|---|---|---|
| Day Observed | Mean No. flies | Mean No. flies | Percent Reduction |
| 1* | 2218 | 101 | 95 |
| 2 | 1670 | 446 | 73 |
| 3 | 1967 | 401 | 79 |
| 4 | 1364 | 685 | 49 |
| Overall Mean** | 1804a | 408b | 77 |

*Fly count recorded 2 hours post-treatment.
**Means followed by the same letter within the same row are not significant different (P > 0.05).

Example 2. This Example Describes a Study of Two Spray Formulations of C8910 Applied Via a Mist Blower Sprayer Against the Stable Fly *Stomoxys calcitrans* (Linnaeus)

A study was performed to evaluate two formulations of C8910: (A) a 1% C8910+sodium lauryl sulfate (SLS) and (B) 15% C8910/Koalin (98%) and Van Natural XGB dispersant (2%) for efficacy against *Stomoxys calcitrans*. The study was performed by David J. Boxler, Extension Educator, University of Nebraska, West Central Research & Extension Center, 402 West State Farm Rd, North Platte, NE 69101. The study location was University of Nebraska, West Central Research & Extension Center, 402 West State Farm Rd, North Platte, NE 69101, August-October, 2013.

Materials & Methods: The sprayer was an A-1 Model SD-RM20H8R55 mist blower sprayer with four 800 micron nozzles with a line pressure of 40 psi. Knockdown cages were constructed of nylon fly screen, 2" in diameter by 6" in length, with the bottom and top of each cage sealed with a canning jar lid. Three to five day-old mixed sex stable flies were obtained from a lab colony located at the West Central Research & Extension Center.

C8910 formulations A and B were tested for efficacy of stable fly control in knockdown cages on 9/29/13. Twenty-five stable flies were placed in each knockdown cage and there were 4 replicates (cages) per treatment. Knockdown cages were attached to a tethered rope suspended ca. 5 feet above the ground. Formulation (A) was prepared by mixing 38 grams of undiluted C8910 and 19 grams of sodium lauryl sulfate in one gallon of water stirring the mixture with a paint mixer on a drill for 15 minutes. Formulation (B) was prepared by mixing 253 grams of 15% C8910/kaolin (98%) and 13.9 grams of Van Natural XBG dispersant (2%) with one gallon of water stirring the mixture with a paint mixer on a drill for 20 minutes.

Once the materials were in solution they were then applied to cages using an A1 Mist Blower Sprayer which was driven past the cages at a speed of ca. 3 mph positioned 25 feet from the knockdown cages. Upon application of each formulation, the knockdown cages with the flies were taken to the lab and fly mortality was observed. Control flies were sprayed with water prior to the application of the two formulations. Fly mortality was assessed at intervals up to 24 hours post-treatment.

Results: Abbott's Formula was used to determine percent corrected control. Thirty minutes post-treatment, Formulation A had 90 dead flies compared to 23 dead flies for Formulation B, and only 1 stable fly in the control cages died. Two hours post-treatment, Formulation A had 98 dead flies compared to Formulation B with 47 dead. Fly mortality for the control remained at 1. Fly mortality for both formulations did not change during the next three observation intervals. Mortality in the control increased to 2 dead at 19 hours post-treatment (Table 3). Overall, percent mortality for Formulation A was 97% versus 46% for Formulation B.

The mist blower used in this study utilized a diaphragm pump, which is not designed to spray a wettable powder formulation, since diaphragm pumps do not produce enough agitation to keep wettable powder formulations in suspension. This factor might help explain why Formulation (B) was not as efficacious as Formulation (A) against the stable fly. Additionally, the surfactant present only in Formulation A would enhance fly contact and efficacy (Reifenrath, 2007).

TABLE 3

| | Number of stable flies dead over time after exposure to different formulations of C8910 spray when applied by a mist blower sprayer. | | | | | |
|---|---|---|---|---|---|---|
| No. stable flies dead at 30 minutes post-treatment | | | | | | |
| Treatment | Rep 1 | Rep 2 | Rep 3 | Rep 4 | Total Dead | % Mortality* |
| Control | 1 | 0 | 0 | 0 | 1 | |
| Formulation A | 25 | 25 | 25 | 20 | 90 | 89 |
| Formulation B | 19 | 0 | 4 | 0 | 23 | 22 |
| No. stable flies dead at 2 hours post-treatment | | | | | | |
| Treatment | Rep 1 | Rep 2 | Rep 3 | Rep 4 | Total Dead | % Mortality |
| Control | 1 | 0 | 0 | 0 | 1 | |
| Formulation A | 25 | 25 | 25 | 23 | 98 | 98 |
| Formulation B | 25 | 2 | 19 | 1 | 47 | 46 |
| No. stable flies dead at 3 hours post-treatment | | | | | | |
| Treatment | Rep 1 | Rep 2 | Rep 3 | Rep 4 | Total Dead | % Mortality* |
| Control | 1 | 0 | 0 | 0 | 1 | |
| Formulation A | 25 | 25 | 25 | 23 | 98 | 98 |
| Formulation B | 25 | 2 | 19 | 1 | 47 | 46 |
| No. stable flies dead at 19 hours post-treatment | | | | | | |
| Treatment | Rep 1 | Rep 2 | Rep 3 | Rep 4 | Total Dead | % Mortality* |
| Control | 1 | 0 | 1 | 0 | 2 | |
| Formulation A | 25 | 25 | 25 | 23 | 98 | 97 |
| Formulation B | 25 | 2 | 19 | 1 | 47 | 46 |
| No. stable flies dead at 24 hours post-treatment | | | | | | |
| Treatment | Rep 1 | Rep 2 | Rep 3 | Rep 4 | Total Dead | % Mortality* |
| Control | 1 | 0 | 1 | 0 | 2 | |
| Formulation A | 25 | 25 | 25 | 23 | 98 | 97 |
| Formulation B | 25 | 2 | 19 | 1 | 47 | 46 |

*Percent mortality corrected by Abbott's Formula.
Formulation A = 1% C8910 + 0.5% surfactant (SLS)
Formulation B = 1% (w/v) C8910 + 0.5% XGB dispersant

Example 3. Materials and Methods

Test Chemicals:

An approximately 60:40 mixture of octanoic and decanoic acids (Emery 657) was obtained from Emery Oleochemicals, Cincinnati, Ohio. Sodium hydroxide (98.1%) was obtained from Fisher Scientific, Fair Lawn, New Jersey Choline chloride was obtained from Research Products International, Mt. Prospect, Illinois Insects:

Mixed sex stable flies (*Stomoxys calcitrans*) were obtained as pupae from a colony at the University of Nebraska West Central Research and Extension Center, North Platte, Nebraska. Mixed sex horn flies (*Haematobia irritans*), sensitive and knockdown resistant (Kdr), were obtained as pupae from a colony at The Center for Animal Health and Food Safety, New Mexico State University, Las Cruces, New Mexico. Adult horn and stable flies were allowed to emerge in 1 cubic foot cages at approximately 80 degrees Fahrenheit and were maintained on citrated whole blood (Quad Five, Rygate, Montana). Mixed sex house flies (*Musca domestica*) were obtained as pupae from Carolina Biological, Charlotte, North Carolina Adults were allowed to emerge in 1 cubic foot cages at approximately 80 degrees Fahrenheit and were maintained on water and sugar cubes. Mixed sex German cockroaches (*Blattella germanica*) were obtained as adults from Carolina Biological. Prior to use, roaches were kept with the supplied food source in paper towels contained in 1 cubic foot cages. Flies were used 4-6 days post emergence.

Formulations:

An aqueous emulsion of the octanoic/decanoic acid mix (C8C10) was prepared by addition to an aqueous solution of the sodium salts of the fatty acids, prepared by mixing equal molar amounts of sodium hydroxide and fatty acid. In this fashion, free fatty acid (FFA) concentrations of 0.005, 0.01, 0.02, 0.04, 0.08 and 1.0% were obtained. Choline chloride was added to the emulsions to obtain concentrations of 0.005, 0.01, 0.02, 0.04, 0.08 and 1.0%. Distilled water and a 1.0% concentration of choline chloride in water served as controls.

Laboratory Test Procedure:

Briefly, 1 ml of aqueous dispersed experimental fatty acid formulation, with and without choline chloride, was evenly pipetted onto a 9 cm diameter disk of filter paper (Whatman No. 1) contained in a standard size disposable plastic Petri dish. An additional treatment was made with an aqueous solution of choline chloride at 1% concentration. A negative control made by applying 1 ml of distilled water to the filter paper. Fifteen insects (6 in the case of German cockroaches) were introduced into the covered Petri dish plate. Insect status (incapacitation) was tested within a few minutes of treatment and at multiple time points up to and including 24 hours post-treatment. Operationally, an insect was considered knocked down (incapacitated) if it is unable to stand, crawl, or fly in a coordinated way. The holding container is tapped a few times before a final determination is made. Mortality was measured at 24 hours post-exposure. An insect was classified as dead if it was immobile or unable to stand, crawl, or fly in a coordinated way at 24 hours (Anonymous, 2012). For each treatment, tests were replicated 3-4 times.

Arkansas Field Test Procedure:

This study occurred at the University of Arkansas Research and Extension Center (North Farm) pastures located just off the University of Arkansas main campus in Fayetteville, Arkansas. Eighteen university-owned bred or breeding aged heifers of similar genetics were used. These heifers were randomly allocated into three equal treatment groups which were maintained on three separate pastures. Each treatment consisted of six bred or breeding aged heifers. Water, mineral supplements and forage were supplied ad libitum. The university herd provided greater control vs. producer herds, but limited replication to 6/group, which is still sufficient to distinguish treatments based on past experience. This animal use was approved by the University of Arkansas IACUC committee. Treatments included a 1% C8C10 (mix of octanoic and decanoic acids) aqueous emulsion with and without adjuvant (1% choline chloride), a positive control (10% permethrin 10%/piperonyl butoxide—Pyrahna Stock Guard®) diluted to 0.05% actives, and a negative (untreated) control.

Treatments were applied with a 3-D QUIK HAND™ Cattle Sprayer made by 3-D Cattle Equipment, LLC, Pine Ridge, Arkansas 71961. The spray unit is an automated sprayer which applies a pre-determined amount of insecticide per animal as it passes through the sprayer entrance. The sprayer was located in an entrance to a fenced-in water station and feeding station to provide control of application frequency. Treatments were applied to cattle as they entered and exited the entrance of the water station. Frequency of spray applications was determined by the number of times cattle visited the water tank. As a rule, cattle normally require water twice a day, so animals could receive four spray treatments per day.

Sierra Research Laboratories Field Test Procedure:

This study occurred at Sierra Research Laboratories (SRL), Modesto, CA, on pastures located in the central valley of California. Eighteen heifers were used in the study, allocated into three equal groups, 2 of which received treatments, with the remaining group serving as an untreated or negative control. One treatment (XPS 143) was a 1% C8C10 (mix of octanoic and decanoic acids) aqueous emulsion without choline chloride and the second treatment (XPS 144) was 1% C8C10 with 1% choline chloride in an identical aqueous emulsion. The test protocol was reviewed by the SRL IACUC Committee before the study was initiated.

Treatments were applied with a hand-held 1 gallon sprayer equipped with a flat fan spray nozzle. Each animal in the treatment groups was treated with 500 mL of the appropriate test formulation. To ensure complete spray coverage, animals were restrained in a cattle chute and spray was applied to the animal's top-line, sides, belly and legs in a uniform manner. The animals were released into their specific pasture to dry. Two treatments were conducted one week apart and fly counts were conducted at 2 hours after treatment and at 1, 2, 3 and 4 days after treatment.

Example 4. This Example Describes Incapacitation of Stable Flies by the Compositions of the Disclosure Incapacitation of stable flies was tested according to the methods described in Example 3. Results are shown in Table 4A and FIGS. 4-7. Incapacitation of permethrin sensitive and permethrin resistant stable flies was also tested. Results are shown in Table 4B.

TABLE 4A

Stable Fly incapacitation at 24 hours following
exposure to a free fatty acid (FFA)
mix of octanoic and decanoic acid (C8C10) in aqueous
emulsion with and without adjuvant (choline chloride).

| Formulation | % Incapacitation at 24 h (Mean +/− S.D., N = 3) |
|---|---|
| C8C10 0.02% FFA | 9 +/− 4 |
| C8C10 0.02% FFA plus 0.02% Choline Chloride | 30 +/− 11 |

TABLE 4A-continued

Stable Fly incapacitation at 24 hours following
exposure to a free fatty acid (FFA)
mix of octanoic and decanoic acid (C8C10) in aqueous
emulsion with and without adjuvant (choline chloride).

| Formulation | % Incapacitation at 24 h (Mean +/− S.D., N = 3) |
|---|---|
| C8C10 0.02% FFA plus 1.0% Choline Chloride | 97 +/− 5 |
| C8C10 0.04% FFA | 4 +/− 8 |
| C8C10 0.04% FFA plus 0.04% Choline Chloride | 78 +/− 19 |
| C8C10 0.08% FFA | 96 +/− 4 |
| C8C10 0.08% FFA plus 0.08% Choline Chloride | 100 +/− 0 |
| C8C10 1.0% FFA | 100 +/− 0 |
| C8C10 1.0% FFA plus 1.0% Choline Chloride | 100 +/− 0 |
| Choline Chloride, 1.0% | 4 +/− 3 |
| Distilled water | 2 +/− 4 |

TABLE 4B

Sensitive and Permethrin Resistant Stable Fly Incapacitation by C8C10
(Mix of Octanoic and Decanoic Acids)
at various concentrations of
Free Fatty Acids (FFA) and Adjuvant
(Choline Chloride) in an Organic Aqueous Emulsion Formulation.

| Formulation | % Incapacitation at 24 h (Mean +/− S.D., N = 3) | |
|---|---|---|
| | Sensitive* | Resistant* |
| C8C10 0.04% FFA | 17 +/− 2 | — |
| C8C10 0.04% FFA plus 0.04% Choline Chloride | 67 +/− 8 | — |
| C8C10 0.08% FFA | 91 +/− 8 | 26 +/− 9 |
| C8C10 0.08% FFA plus 0.08% Choline Chloride | 89 +/− 5 | 81 +/− 6 |
| C8C10 0.08% FFA (repeat 1) | — | 43 +/− 9 |
| C8C10 0.08% FFA plus 0.08% Choline Chloride (repeat 1) | — | 89 +/− 6 |
| C8C10 0.08% FFA (repeat 2) | — | 48 +/− 24 |
| C8C10 0.08% FFA plus 0.08% Choline Chloride (repeat 2) | — | 76 +/− 25 |

*Sensitive and resistant strains of stable flies were provided as pupae from the colonies at the
University of Florida

Example 5. This Example Describes Incapacitation of Horn Flies by the Compositions of the Disclosure Incapacitation of sensitive and knockdown resistant (Kdr) horn flies was tested according to the methods described in Example 3. Results are shown in Tables 5 and 6 and FIGS. 8-13.

TABLE 5

Sensitive and Knockdown Resistant (Kdr) Horn Fly Incapacitation by C8C10 (Mix Octanoic and Decanoic Acids)
at various concentrations of Free
Fatty Acids (FFA) and Adjuvant
(Choline Chloride) in an Organic
Aqueous Emulsion Formulation.

| Formulation | % Incapacitation at 24 h (Mean +/− S.D., N = 3) | |
|---|---|---|
| | Sensitive | Kdr |
| C8C10 0.005% FFA | 19 +/− 6 | 21 +/− 20 |
| C8C10 0.005% FFA plus 0.005% Choline Chloride | 30 +/− 9 | 35 +/− 19 |

TABLE 5-continued

Sensitive and Knockdown Resistant (Kdr) Horn Fly Incapacitation by C8C10 (Mix Octanoic and Decanoic Acids)
at various concentrations of Free
Fatty Acids (FFA) and Adjuvant
(Choline Chloride) in an Organic
Aqueous Emulsion Formulation.

| Formulation | % Incapacitation at 24 h (Mean +/− S.D., N = 3) | |
|---|---|---|
| | Sensitive | Kdr |
| C8C10 0.010% FFA | 24 +/− 8 | 10 +/− 17 |
| C8C10 0.010% FFA plus 0.010% Choline Chloride | 30 +/− 8 | 40 +/− 16 |
| C8C10 0.010% FFA | 38 +/− 14 | 8 +/− 7 |
| C8C10 0.010% FFA plus 1.00% Choline Chloride | 57 +/− 19 | 51 +/− 16 |
| C8C10 0.020% FFA | 77 +/− 12 | 58 +/− 28 |
| C8C10 0.020% FFA plus 0.020% Choline Chloride | 86 +/− 7 | 80 +/− 3 |
| C8C10 1.00% FFA | 100 +/− 0 | 100 +/− 0 |
| C8C10 1.00% FFA plus 1.00% Choline Chloride | 100 +/− 0 | 100 +/− 0 |
| Choline Chloride, 1.0% | 0 +/− 0 | 2 +/− 4 |

TABLE 6

Sensitive and Knockdown Resistant (Kdr) Horn Fly
Incapacitation by
C8C9C10 (Mix of Octanoic , Nonanoic and
Decanoic Acids)
at a 0.020% Concentration of Free Fatty Acids
(FFA) and Adjuvant (Choline Chloride) in a
Synthetic
Aqueous Emulsion Formulation.

| Formulation | % Incapacitation at 24 h (Mean +/− S.D., N = 3) | |
|---|---|---|
| | Sensitive | Kdr |
| C8C9C10 0.020% FFA | 14 +/− 10 | 26 +/− 17 |
| C8C9C10 0.020% FFA plus 0.020% Choline Chloride | 37 +/− 11 | 44 +/− 19 |

Example 6. This Example Describes Incapacitation of House Flies by the Compositions of the Disclosure Incapacitation of house flies was tested according to the methods described in Example 3. Results are shown in Table 7 and FIG. 14.

TABLE 7

House fly Incapacitation at 24 hours Following Exposure to
Free Fatty Acid (FFA) Mix of Octanoic/Decanoic acids
(C8C10) in Aqueous Emulsion with and without Adjuvant
(Choline Chloride).

| Formulation | % Incapacitation at 24 h (Mean +/− S.D.) | N |
|---|---|---|
| C8C10 0.08% FFA | 29 +/− 48 | 4 |
| C8C10 0.08% FFA plus 0.08% Choline Chloride | 98 +/− 10 | 4 |
| C8C10 1.0% FFA | 100 +/− 0 | 3 |
| C8C10 1.0% FFA plus 1.0% Choline Chloride | 100 +/− 0 | 3 |

TABLE 7-continued

House fly Incapacitation at 24 hours Following Exposure to
Free Fatty Acid (FFA) Mix of Octanoic/Decanoic acids
(C8C10) in Aqueous Emulsion with and without Adjuvant
(Choline Chloride).

| Formulation | % Incapaci-tation at 24 h (Mean +/− S.D.) | N |
|---|---|---|
| Choline Chloride 1.0% | 0 +/− 0 | 3 |
| Distilled Water | 0 +/− 0 | 3 |

Example 7. This Example Describes Incapacitation
of German Cockroaches by the Compositions of
the Disclosure Incapacitation of German cockroaches was tested according to the methods described in Example 3. Results are shown in Table 8 and FIG. 15. Only minimal incapacitation was observed at 24 hours exposure of German cockroaches to an aqueous emulsion of C8C10 fatty acids at FFA concentrations of 0.08, 0.16 and 0.24%. And 1% choline chloride by itself had no effect. Addition of 1% choline chloride to the 2 lower concentration formulations resulted in modest increases in incapacitation and a substantial increase at the higher concentration (67% vs 11%, Table 8, row 6 vs. 7). At a high concentration of fatty acids (1%), nearly all the roaches were incapacitated at 24 hours, regardless of adjuvant. FIG. 15 displays the time course of incapacitation for the 0.24% FFA formulation.

TABLE 8

German Cockroach Incapacitation at 24 hours
Following Exposure to Free Fatty Acid
(FFA) Mix of Octanoic/Decanoic Acids (C8C10) in aqueous emulsion with and without Adjuvant (Choline Chloride).

| Formulation | % Incapaci-tation at 24 h (Mean +/− S.D., N = 3) |
|---|---|
| C8C10 0.08% FFA | 0 +/− 0 |
| C8C10 0.08% FFA plus 0.08% Choline Chloride | 16 +/− 12 |
| C8C10 0.16% FFA | 4 +/− 6 |
| C8C10 0.16% FFA plus 1.00% Choline Chloride | 21 +/− 18 |
| C8C10 0.24% FFA | 11 +/− 10 |
| C8C10 0.24% FFA plus 0.24% Choline Chloride | 67 +/− 17 |
| C8C10 1.0 % FFA | 94 +/− 10 |
| C8C10 1.0% FFA plus 1.0% Choline Chloride | 90 +/− 17 |
| Choline Chloride, 1.0% | 0 +/− 0 |

Example 8. This Example Describes Horn Fly Field
Trials of 1% C8C10 with and without Adjuvant
(1% Choline Chloride)

Reduction of native horn flies on cattle was tested according to the Arkansas field test methods described in Example 3. Results are shown in FIG. 16. Reduction of native horn flies on cattle was also tested according to the Sierra Research Laboratories field test methods described in Example 3. Both XPS 143 and XPS 144 (containing choline chloride) almost completely eliminated horn flies at 2 hours post treatment (from 300-400 flies to about 10 or less), but XPS 144 had a better residual effect at day 2 (108 vs. 158), day 3 (75 vs. 133) and day 4 (104 vs. 225) after the first treatment and day 10 (108 vs. 162) and day 11 (88 vs. 208) after the second treatment. XPS 144 maintained horn fly numbers at about 100 flies/animal (well below 200 flies/animal the economic injury level), whereas XPS 143 did not.

Overall, the field data from Arkansas and Sierra Research Laboratories support the idea that choline chloride is an effective adjuvant for fatty acid based fly control formulations, whether applied with a hand-held sprayer or an automatic spray device.

Example 9. This Example Describes
Mosquito-Laboratory Trials of Incapacitation of
Female *Culex* Mosquitoes by a Fatty Acid Mix of
Octanoic and Decanoic Acids (C8C10) with and
without Adjuvant (Choline Chloride)

Adult female *Culex quinquefasciatis* mosquitoes were obtained from Benzon Research, Carlilse, PA Mosquitoes were housed in 1 cubic foot cages at approximately 80° F. and maintained on sugar water. An aqueous emulsion of the octanoic/decanoic acid mix (C8C10, Emery 658, Cincinnati OH) was prepared by addition of the neat fatty acid mix to an aqueous solution of emulsifier to yield a 1% free fatty acid (FFA) level. Adjuvant was added to a portion of this emulsion to give a 1% concentration. These emulsions were diluted with water to give FFA and adjuvant concentrations of 0.015, 0.04, and 0.08%. Additionally, adjuvant was added to the 0.015% FFA emulsion to give an adjuvant concentration of 1%. Distilled water served as a control.

A 1 ml of aqueous dispersed experimental fatty acid formulation, with and without adjuvant, was evenly pipetted onto a 9 cm diameter disk of filter paper (Whatman No. 1) contained in a standard size disposable plastic Petri dish. A negative control was made by applying 1 ml of distilled water to the filter paper. Fifteen insects were introduced into the covered Petri dish. Insect status (incapacitation) was tested within a few minutes of treatment and at multiple time points up to and including 24 hours post-treatment. Operationally, an insect was considered knocked down (incapacitated) if it was unable to stand, crawl, or fly in a coordinated way. The holding container was tapped a few times before a final determination was made. Mortality was measured at 24 hours post-exposure. An insect was classified as dead if it was immobile or unable to stand, crawl, or fly in a coordinated way at 24 hours. For each treatment, tests were replicated 3 times.

As expected, increasing the concentration of the fatty acids alone (C8C10) resulted in increased mosquito incapacitation at 24 hours (Table 9); however, 24 hour incapacitation never reached 100% over the dose range studied. The lowest concentration of adjuvant (0.015%, Table 9) did increase short term incapacitation (at around 200 minutes, data not shown), but did not increase 24 hour incapacitation. A higher concentration of adjuvant (1.0%) to the lowest concentration of C8C10 did increase 24 hour incapacitation (Table 9). At 0.04% and 0.08% concentrations of C8C10 and adjuvant, the addition of adjuvant increased 24 hour incapacitation, reaching 100% at the highest concentration of the combination.

TABLE 9

Twenty-four hour incapacitation of female *Culex quinquefasciatus* mosquitoes by a fatty acid mix of octanoic and decanoic acids (C8C10) with and without adjuvant (choline chloride).

| Formulation | % Incapacitation at 24 hours post treatment Mean +/- S.D. |
|---|---|
| 0.015% C8C10 | 9 +/- 8 |
| 0.015% C8C10 + 0.015% Adjuvant | 8 +/- 4 |
| 0.015% C8C10 + 1.0% Adjuvant | 34 +/- 14 |
| 0.040% C8C10 | 42 +/- 34 |
| 0.040% C8C10 + 0.040% Adjuvant | 71 +/- 21 |
| 0.080% C8C10 | 85 +/- 26 |
| 0.080% C8C10 + 0.08% Adjuvant | 100 +/- 0 |

Example 10. This Example Describes the Effect of Octanoic/Decanoic Fatty Acid Blend (C8C10) Formulations XPS-144 (1% Free Fatty Acid, 1% Choline Chloride) and XPS-203 (3.7% Free Fatty Acids, 3.7% Choline Chloride) on the Behavior of Adult Stable Flies in Free-Choice Test Cages In this example, toxicity tests with mixed-sex stable flies were conducted in so-called free choice cages. These cages are 8"×8" square and about 2" tall and have screened openings to allow air to be pulled through the cages (600 ml/min) to prevent build-up of fatty acid vapor. The floor is divided into 4 quadrants, each 4"×4" and covered with dark brown colored felt. To help attract flies to the floor, an LED light illuminated the cage from below and provided a slight temperature gradient. Fifty mixed sex adult stable flies were placed in each cage. Flies were free to land on any of the quadrants or other inner surfaces of the cage. When all 4 quadrants were treated with distilled water (3 ml per 4"×4" felt swatch), fly mortality over 24 hours was about 2% (Table 10). Treating 2 non-adjacent swatches with 3 ml of XPS-144 (1% C8C10 fatty acids) and the remaining quadrants with an equal volume of distilled water increased fly incapacitation to about 50% at 2 hours post injection of flies and about 60% at 24 hours (Table 10). Repeating the experiment with 3 ml of XPS-203 (3.7% C8C10) resulted in about 70% incapacitation at 2 hours and about 75% incapacitation at 24 hours (Table 10). When the stable flies reached egg-laying stage ($3^{rd}$ replicate), an abundant number of eggs (approximately 400 total) were deposited in all 4 quadrants treated with distilled water at 2 hours post fly injection. With the XPS-144 treatment at 2 hours post fly injection, fewer eggs were laid (approximately 60 total and primarily on the distilled water treated quadrants (55). With the XPS-203 treatment (higher concentration of free fatty acids) at 24 hours post fly injection, egg deposition was almost completely inhibited in all quadrants (approximately 27 total, with the majority on distilled water treated surfaces (23).

When the stable flies are introduced into the cages, they initially fly about seemingly in a random fashion, colliding with the walls, floor and ceiling of the cage. They make contact with the fatty acid treated surfaces that is brief, but sufficient to cause incapacitation. As compared to the forced contact experiments with petri dishes, the fatty acid concentration necessary for incapacitation is significantly higher and the rate of incapacitation is lower. While one can argue that the level of incapacitation was inadequate, reaching about 75% at best in this example, deposition of eggs was almost completely inhibited with XPS-203, resulting in fewer flies in generations to come.

TABLE 10

Stable fly incapacitation in free choice cages at 2-h and 24-h after treatment with fatty acid formulations XPS-144 and XPS-203.

| Treatment | FA Conc. | Choline Cl Conc. | 2-h Incap. | 24-h Incap. | Egg Dep. (Total) | N |
|---|---|---|---|---|---|---|
| XPS-144 | 1.0% | 1.0% | 52 +/- 20% | 58 +/- 19% | 61 (2-h) | 3 |
| XPS-203 | 3.7% | 3.7% | 69 +/- 28% | 77 +/- 22% | 27 (24-h) | 3 |
| Dist. Water | 0.0% | 0.0% | — | 2 +/- 2% | 389 (2-h) | 3 |

References cited in this disclosure:
1. Anonymous. 2009. Tolerance exemption petition for the active ingredients C8-C10 n-carboxylic acids (octanoic acid, nonanoic acid, and decanoic acid). US Environmental Protection Agency, Oct. 8, 2009.
2. Anonymous. 2012. Definition of knock-down and mortality for adult mosquitoes adopted at the $14^{th}$ WHOPES working group meeting, p. 66.
3. Chellquist, E M and Reifenrath, W G. Distribution and Fate of Diethyl Malonate and Diisopropyl Fluorophosphate on Pig Skin in Vitro. J. Pharm. Sci. 77: 850-854, 1988
4. Ciolino, 2019, Personal communication, AgroGreen Business, Emery Oleochemicals, Cincinnati, OH
5. Dunford, J. C., Wirtz, R. A., Reifenrath, W. G., Falconer, A., Frame, L. N. Marika, J. A. and Brogdon, W. G. 2014. Determination of insecticidal effect ($LCD_{50}$ and $LCD_{90}$ of organic fatty acids mixture (C8910+silicone) against malaria vectors. J. Parasitol. Vector Biol., 6: 131-141.
6. Dunford, J. C. Falconer, A. Leite, L. N. Wirtz, R. A. and Brogdon, W. G. 2016. Determination of insecticidal effect (LC50 and LC90) of organic fatty acids mixture (C8910+ silicone) against *Aedes aegypti* and *Aedes albopictus* (Diptera: Culicidae). J. Med. Entomol. 53: 699-702.
7. Keyl, M J, Michaelson, I A, and Whittaker, V P. 1957. Physiologically active choline esters in certain marine gastropods and other invertebrates. Journal of Physiology, 139: 434-454.
8. Mullens, B A, Reifenrath, W G, and Butler, S M. 2009. Laboratory repellency trials of fatty acids against house flies, horn flies, and stable flies (Diptera: Muscidae), Pest Management Science, 65: 1360-1366.
9. Mullens, B. A., Watson, D. W., Gerry, A. C. Sandelin, B. A. Soto, D. Rawls, D., Denning, S. Guisewite, L. and Cammach, J. 2017. Field trials of fatty acids and geraniol applied to cattle for suppression of horn flies, *Haematobia irritans* (Diptera: muscidae), with observations on fly defensive behaviors. Vet. Parasitol. 245: 14-28.
10. Mullens, B. A., Soto, D. Gerry, A. C. Fowler, F. E and Diniz, A. N. 2018. Effects of fatty acid and geraniol repellent-oil mixtures applied to cattle on blood feeding and reproductive parameters in field populations of *Haematobia irritans* (Diptera: Muscidae). J. Med. Entomol., 55 (2): 408-416
11. Reifenrath, W. G., 2001. Natural insect and arthropod repellent, U.S. Pat. No. 6,306,415B1, Oct. 23, 2001.
12. Reifenrath, W. G. 2005. Natural insect repellent, U.S. Pat. No. 6,953,814B2, Oct. 11, 2005.
13. Reifenrath, W. G. 2007a. Enhanced skin absorption and fly toxicity of permethrin in emulsion formulation. Bull. Environ. Contam. Toxicol. 78: 299-303.

14. Reifenrath, W. G. 2007b. Natural fly repellent for livestock, CSREES Award No. 2003-33610-13044. Phase II Final Report, Feb. 1, 2007.

15. Reifenrath, W. G. 2014. Pesticidal Compositions for Insects and Arthropods, U.S. Pat. No. 8,911,757, issued Dec. 16, 2014.

16. Reifenrath, W. G. 2015a. Controlled release formulations of fatty acid based repellent/insecticide for livestock protection. Proposal No. 2014-00521, Phase 1 final Report, Stratacor, Inc., Feb. 26, 2015. p. 80.

17. Reifenrath, W. G. 2015b. "Laboratory (in vitro) test method for determining the disposition of chemicals in contact with the skin, In: Pesticide Formulation and delivery Systems: 34th Volume, Translating Basic Science into Products. STP 1579, Y. Bernal, Ed., pp. 52-64 doi:10.1520/STP157920130167, ASTM International, West Conshohocken, PA 18. Reifenrath, W. G. 2015c. "Laboratory and Field Studies of C8910, a fatty acid based insect/arthropod repellent and biopesticide," In: Pesticide Formulation and delivery Systems: 34th Volume, Translating Basic Science into Products. STP 1579, Yasmith Bernal, Ed., pp. 36-51, doi:10.1520/STP157920130167, ASTM International, West Conshohocken, PA 19. Roh, G. H., Zhou, X. Wang, Y. Cermak, S. C., Kenar, J. A. Lehmann, A, Han, B., Taylor, D. B., Zeng, X. Park, C. G., Brewer, G. J. and Zhu, J. J. 2019. Spatial repellency, antifeedant activity and toxicity of three medium chain fatty acids and their methyl esters of coconut fatty acid against stable flies. Pest Management Science, https.//doi.org/10.11002/ps. 5574.

20. Samuel, M. Oliver, S. V., Wood, O. R., Coetzee, M. and Brooke, B. D. 2015. Evaluation of the toxicity and repellence of an organic fatty acids mixture (C8910) against insecticide susceptible and resistant strains of the major malaria vector *Anopheles funestus* Giles (Diptera: Culicidae), Parasites & Vectors 8:321-327.

21. Siegler, E. H. and Popenoe, C. H., 1925. Some insecticidal properties of the fatty acid series. Journal of Agricultural Research, Vol. 29, pp. 259-261.

22. Taylor, R. J. 2010. The efficacy of 15% Stratacor liquid and wettable powder as tick repellents. Test report RJT 171-2010 to Afrivet Business Management, Ltd., South Africa (results presented at the 2012 Repellent Symposium at the Entomological Society of America Annual Meeting, Reno, NV).

23. Younger, C. 2014. C8910 fatty acids in clay. Honey bee (*Apis mellifera*) acute contact toxicity limit test. Stillmeadow, Inc. Sugar Land, T X. Laboratory Study No. 17957-14.

24. Zhu, J. J. Brewer, G. J. Boxler, D. J. Friesen, K., Taylor, D. B. 2014. Comparisons of antifeedancy and spatial repellency of three natural product repellents against horn flies, *Haematobia irritans* (Diptera: Muscidae), Pest. Manag. Sci. 70: 1553-1560.

Although the foregoing disclosure has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference.

What is claimed is:

1. A composition consisting essentially of:
   (a) an active ingredient selected to have an activity that repels, incapacitates, or kills a target insect or a target arthropod, the active ingredient consisting of a mixture of one or more mono alpha carboxylic acids or esters thereof, each independently having a straight carbon chain from 6 to 18 carbon atoms long;
   (b) an emulsifier;
   (c) an adjuvant selected to increase the activity of the active ingredient, the adjuvant consisting of one or more choline salts; and
   (d) a carrier.

2. The composition of claim 1 wherein the emulsifier comprises a carboxylic acid salt.

3. The composition of claim 1 wherein the adjuvant comprises a choline salt.

4. The composition of claim 3 wherein the choline salt comprises choline chloride.

5. The composition of claim 1 wherein the carrier comprises an aqueous emulsion.

6. The composition of claim 1 wherein the carrier comprises water.

7. The composition of claim 1 wherein the active ingredient comprises a mixture of fatty acids, each fatty acid independently having a straight carbon chain from 6 to 18 carbon atoms long.

8. The composition of claim 7 wherein the mixture of fatty acids comprises two or three of:
   (i) a first fatty acid molecule having a straight carbon chain from 6 to 8 carbon atoms long,
   (ii) a second fatty acid molecule having a straight carbon chain from 8 to 9 carbon atoms long, and
   (iii) a third fatty acid molecule having a straight carbon chain from 9 to 10 carbon atoms long, wherein the first fatty acid molecule, the second fatty acid molecule, and the third fatty acid molecule are all different.

9. The composition of claim 8 wherein the first fatty acid molecule comprises octanoic acid, the second fatty acid molecule comprises nonanoic acid, and the third fatty acid molecule comprises decanoic acid.

10. An aqueous concentrate comprising the composition of claim 1.

11. An aqueous dilution of the aqueous concentrate of claim 10.

12. An aqueous dilution of the aqueous concentrate of claim 10 wherein the active ingredient comprises about 0.005% to about 15% by weight of the dilution, the emulsifier comprises about 0.005% to about 25% by weight of the dilution, and the adjuvant comprises about 0.005% to about 5% by weight of the dilution.

13. The aqueous dilution of claim 12 wherein the active ingredient comprises about 1% by weight of the dilution, the emulsifier comprises about 4% by weight of the dilution, and the adjuvant comprises about 1% by weight of the dilution.

14. The composition of claim 1 wherein: the active ingredient comprises a mixture of two or three fatty acids selected from the group consisting of octanoic acid, nonanoic acid, and decanoic acid; the emulsifier comprises sodium salts of the two or three fatty acids; and the adjuvant comprises choline chloride.

15. The composition of claim 14 wherein the two or three fatty acids are octanoic acid, nonanoic acid, and decanoic acid, wherein the octanoic acid, nonanoic acid, and decanoic acid are present in about a 1:1:1 ratio by weight.

16. An aqueous concentrate comprising the composition of claim 15.

17. An aqueous dilution of the aqueous concentrate of claim 16.

18. An aqueous dilution of the aqueous concentrate of claim 16 wherein the active ingredient comprises about 0.005% to about 15% by weight of the dilution, the emulsifier comprises about 0.005% to about 25% by weight of the dilution, and the adjuvant comprises about 0.005% to about 5% by weight of the dilution.

19. The aqueous dilution of claim 18 wherein the active ingredient comprises about 1% by weight of the dilution, the emulsifier comprises about 4% by weight of the dilution, and the adjuvant comprises about 1% by weight of the dilution.

20. The composition of claim 14 wherein the two or three fatty acids are octanoic acid and decanoic acid, wherein the octanoic acid and decanoic acid are present in about a 60:40 ratio by weight.

21. An aqueous concentrate comprising the composition of claim 20.

22. An aqueous dilution of the aqueous concentrate of claim 21.

23. An aqueous dilution of the aqueous concentrate of claim 21 wherein the active ingredient comprises about 0.005% to about 15% by weight of the dilution, the emulsifier comprises about 0.005% to about 25% by weight of the dilution, and the adjuvant comprises about 0.005% to about 5% by weight of the dilution.

24. The aqueous dilution of claim 23 wherein the active ingredient comprises about 1% by weight of the dilution, the emulsifier comprises about 4% by weight of the dilution, and the adjuvant comprises about 1% by weight of the dilution.

25. The composition of claim 1 wherein the active ingredient comprises a fatty acid ester or a mixture of fatty acid esters, each fatty acid ester of the mixture of fatty acid esters independently having a straight carbon chain from 6 to 18 carbon atoms long.

26. A method for incapacitating or killing an insect or arthropod, the method comprising contacting the insect or arthropod with the composition of claim 1.

27. The method of claim 26, wherein the insect or arthropod is selected from the group consisting of mosquitoes, cockroaches, house flies, stable flies, horn flies, horse flies, face flies, eye flies, biting midges, and ticks.

28. The method of claim 26, wherein the insect or arthropod is resistant to permethrin.

29. A method for treating cattle to protect against biting insects or arthropods, the method comprising applying the composition of claim 1 to the cattle.

30. The method of claim 29, wherein applying the composition to the cattle comprises use of an automatic cattle sprayer.

* * * * *